United States Patent [19]
O'Neil et al.

[11] Patent Number: 5,963,864
[45] Date of Patent: Oct. 5, 1999

[54] METHOD AND SYSTEM FOR AUTOMATICALLY CONNECTING TELEPHONE CALLS TO MULTIPLE DEVICES HAVING DIFFERENT DIRECTORY NUMBERS

[75] Inventors: Douglas Rutherford O'Neil, Martietta; J. Carl Bedingfield, Lilburn; JoAnn Blount, Buford, all of Ga.

[73] Assignee: BellSouth Intellectual Property Management Corporation, Atlanta, Ga.

[21] Appl. No.: 08/656,561

[22] Filed: May 31, 1996

[51] Int. Cl.⁶ ....................................................... H04Q 7/20
[52] U.S. Cl. ............................ 455/445; 455/416; 455/433
[58] Field of Search ................................... 455/445, 414, 455/416, 458, 460, 463, 519, 433

[56] References Cited

U.S. PATENT DOCUMENTS

| | | | |
|---|---|---|---|
| 5,315,636 | 5/1994 | Patel | 455/445 |
| 5,319,699 | 6/1994 | Kerihuel et al. | 455/445 |
| 5,329,578 | 7/1994 | Brennan et al. | 379/67 |
| 5,454,032 | 9/1995 | Pinard et al. | 455/445 |
| 5,506,887 | 4/1996 | Emery et al. | 455/445 |
| 5,524,046 | 6/1996 | Paniccia, Jr. | 455/416 |

*Primary Examiner*—Edward F. Urban
*Attorney, Agent, or Firm*—Jones & Askew, LLP

[57] ABSTRACT

A system and method for providing telecommunication extension service to a subscriber with at least a first unit having a first number and a second unit having a second number. Upon receipt of a communication directed to the number associated with the one of the units, ringing is provided to both units. A party may answer either unit, or both units may be answered. If one unit is answered, then the other unit is provided with ringing for a predetermined number of rings or for a preselected amount of time. If the other unit is answered, then the communication is connected in a conference call to the other unit, whereby the communication is connected to both units. The conference call may be monitored for drop-out of one of the units. If one unit drops out, the other unit may remains connected. A disconnection feature allows a party who answers on a unit to provide an indication to discontinue ringing to the other unit, or to disconnect the other unit. If a unit is not engaged in a conference call, then that unit may be used to place and receive telecommunications even if the other unit is engaged.

20 Claims, 6 Drawing Sheets

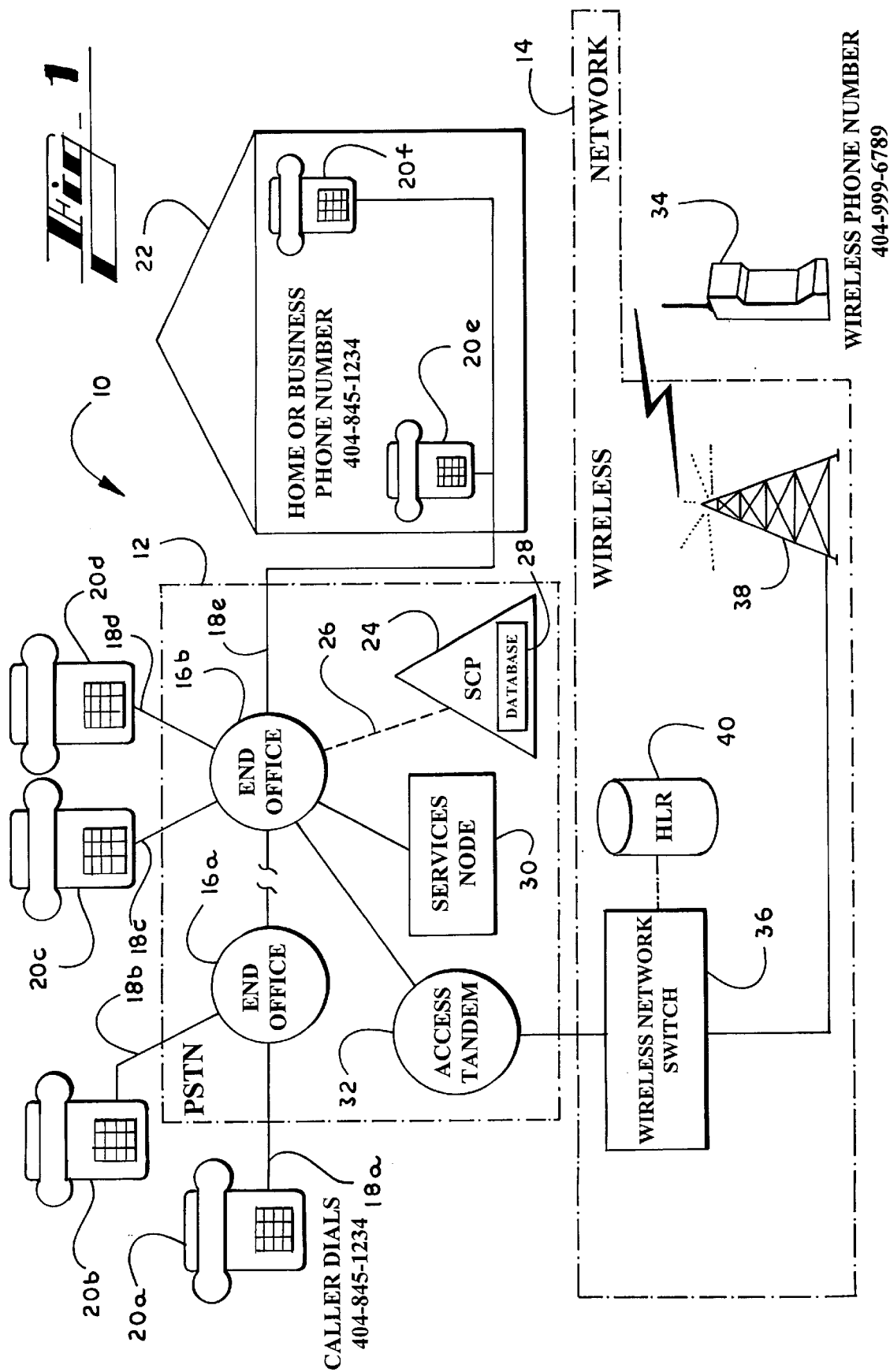

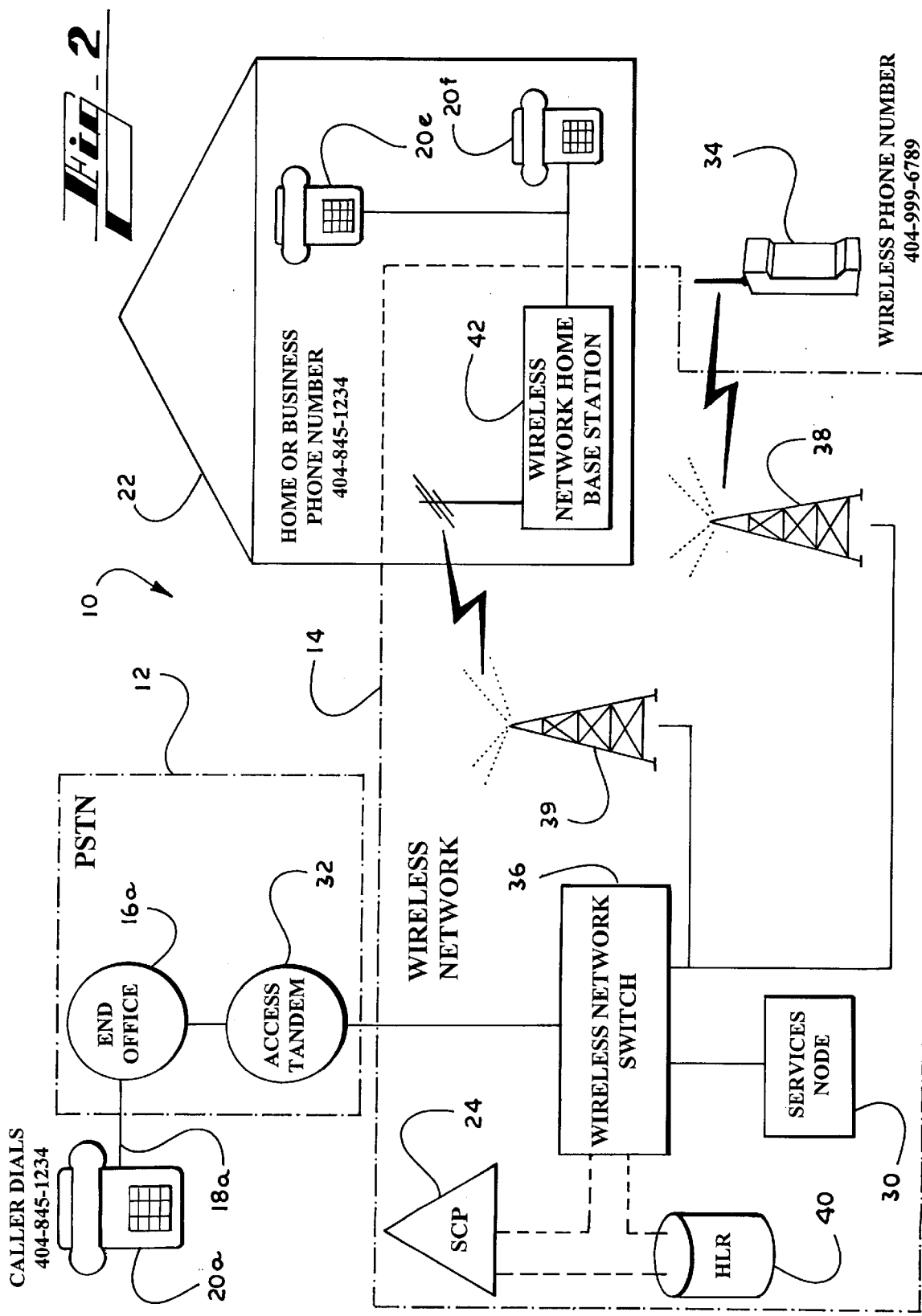

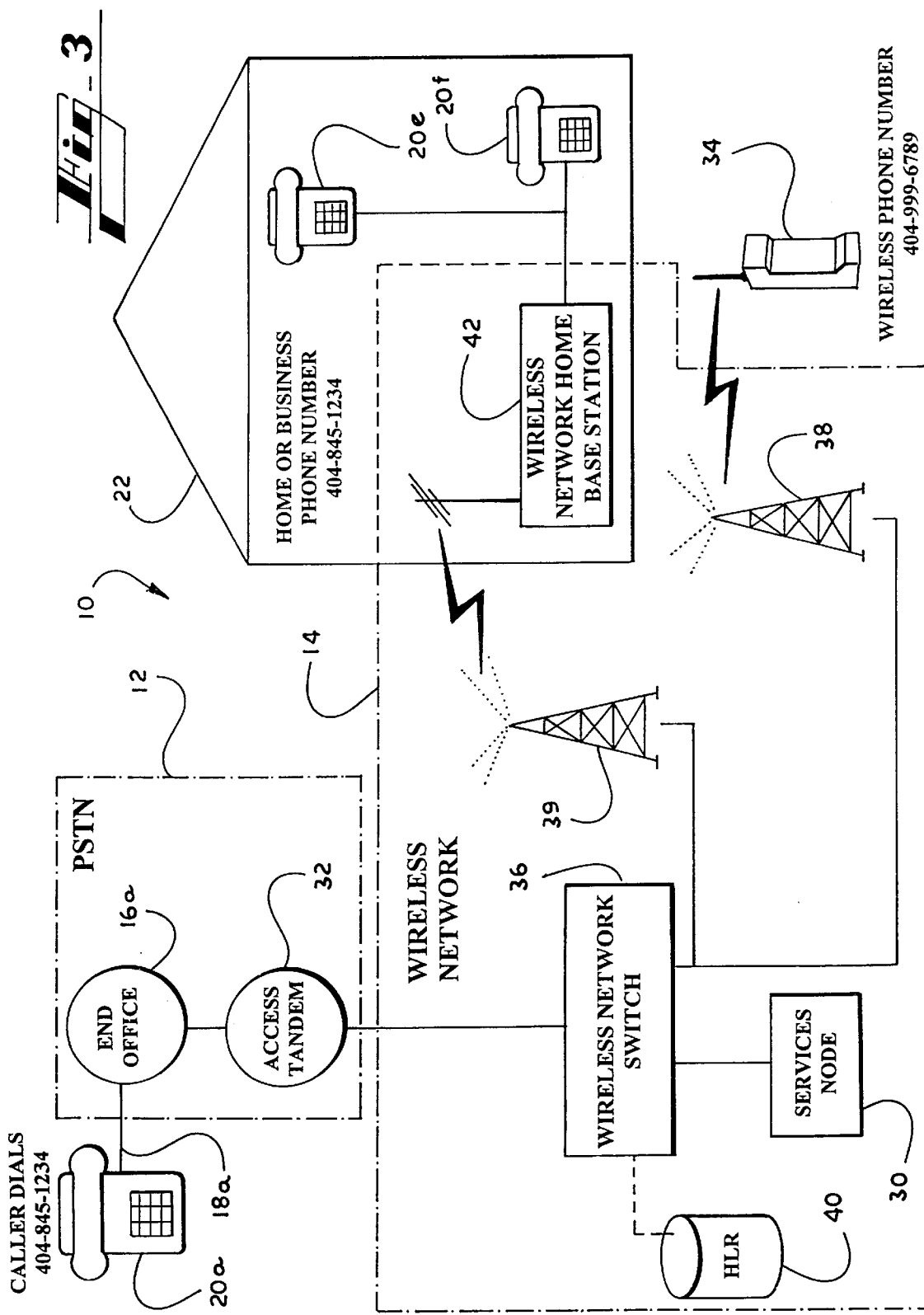

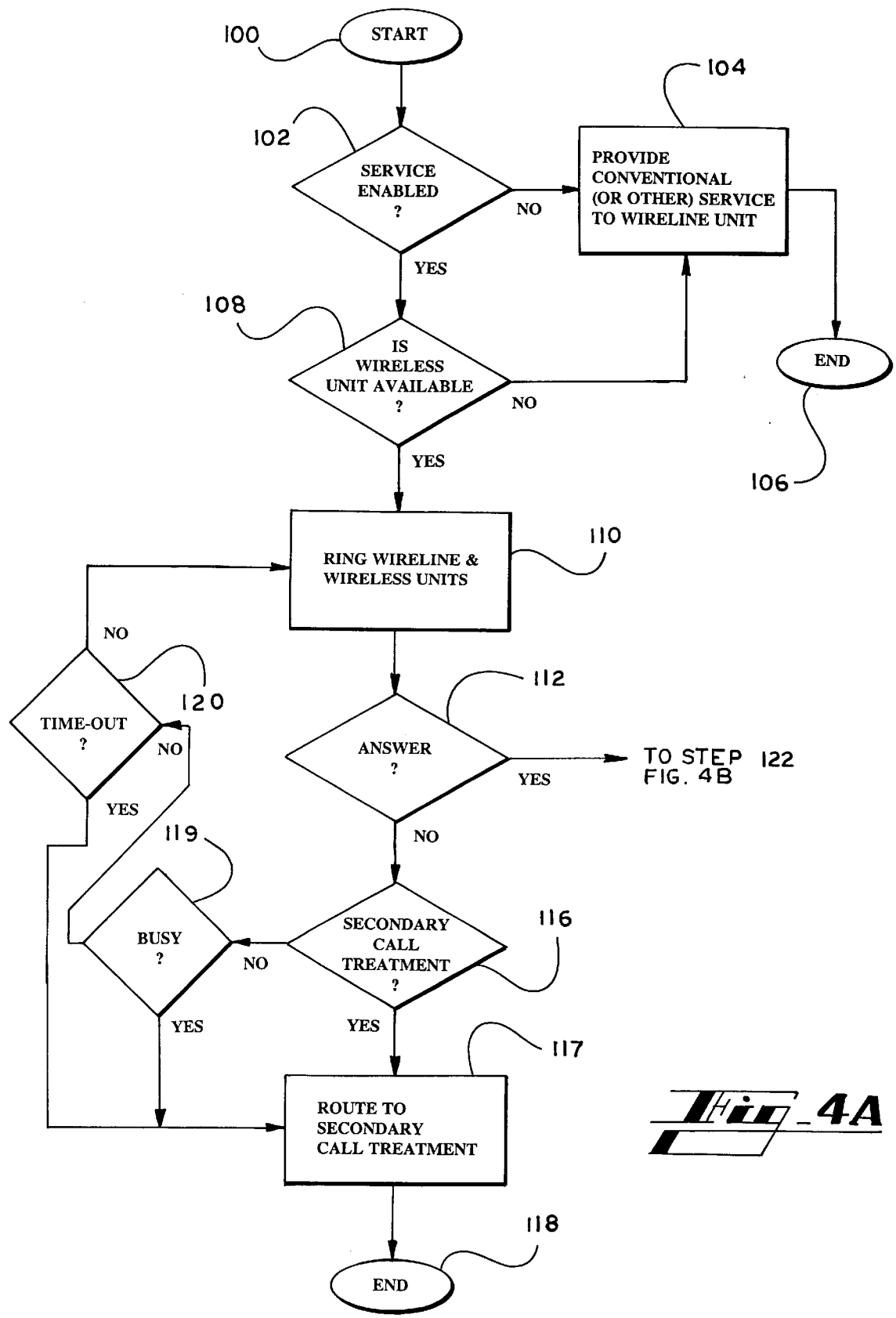

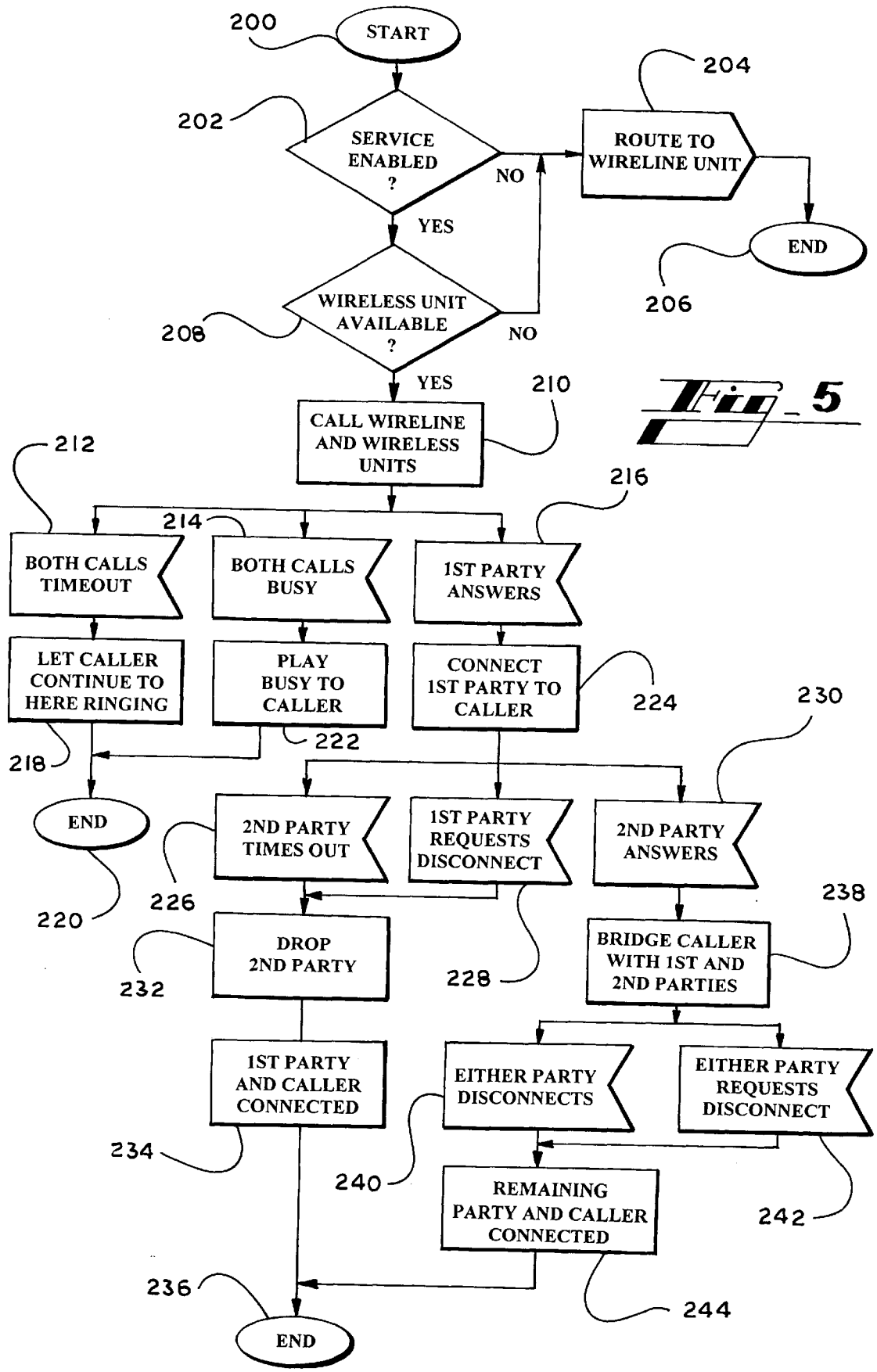
Fig_5

METHOD AND SYSTEM FOR AUTOMATICALLY CONNECTING TELEPHONE CALLS TO MULTIPLE DEVICES HAVING DIFFERENT DIRECTORY NUMBERS

TECHNICAL FIELD

The present invention generally relates to telecommunication systems, and more particularly relates to a system and method for providing a telecommunication extension service to a subscriber who has two or more telecommunication units. Even more particularly, the present invention relates to a system and method for providing a wireless telecommunication extension service in a telecommunication network including a wireline and wireless network to a subscriber with at least a wireline unit and a wireless unit.

BACKGROUND OF THE INVENTION

Keeping in touch. Since the dawn of history, human beings have developed increasingly more sophisticated means of keeping in touch. First, it was language. Then came systems for communicating over distance such as smoke signals, drumbeats and semaphores. The heroes of the Industrial Revolution provided us with the radio, the telegraph and the telephone. More recently, mobile telephones, televisions and networked computers allow us to keep in touch.

The prime importance that people attach to keeping in touch is easily demonstrated by an inventory of a typical person's home. There you will generally find at least a radio, a television and a telephone. Moreover, it is not unusual for a home to have several telephone extensions so that a call may be answered quickly and conveniently. The fear of missing a call and thereby being out-of-touch has led many people to use telephone answering machines and services to record messages from callers. Also, the fear of missing a call and thereby being out-of-touch has led many people to use mobile telephones, which they typically use while they are on the go and away from their homes.

But people with answering machines, mobile telephones and multiple telephone extensions in their homes still miss calls. How can this happen to a person equipped with all that technology? The way it happens is generally not based on technology. Rather, it is based on a failing of human nature. That is, would-be callers generally have difficulty remembering or otherwise keeping up with somebody else's telephone number. Would-be callers have even greater difficulty remembering or otherwise keeping up with somebody else's mobile telephone number as well as somebody else's telephone number. The result is that a caller calls the number that he or she remembers or to which he or she has ready access such as through directory assistance. The caller may not reach the called party at that number. The person has missed the call. The person is out of touch, at least with respect to that caller.

There are groups of people who do not share the human failing of having difficulty in remembering somebody else's telephone number, and especially, of somebody else's telephone number and mobile telephone number. One such group includes "mothers with grown children who allegedly never call their mothers". Members of this group have been known to track down their offspring by repeated calls to the offspring's telephone number and mobile telephone number. Mom will try to reach her offspring at home; if that fails, mom will try to reach her offspring on the mobile telephone; if that fails, mom will try to reach her offspring at home; and if that fails . . . The fact that the offspring is equipped with a telephone and a mobile telephone may increase by two-fold the number of calls that mom will make to reach her offspring. When the offspring finally answers such a call, the offspring gets an earful including a complaint that mom had to make all sorts of efforts to reach the offspring at either the offspring's telephone or mobile telephone. Of course, mom may also provide a little education by quoting Shakespeare: "How sharper than a serpent's tooth it is to have a thankless child."

The foregoing paragraph provides a humorous example. But it demonstrates the inconvenience visited upon a would-be caller. That would-be caller may have to place at least two separate calls to two different numbers to finally reach the person, if the person is equipped with a telephone and a mobile telephone. The likelihood of the caller reaching the person may be doubled because of the person's telecommunications equipment. In other words, the person is less likely to miss a call. However, the inconvenience in making two calls (even if the would-be caller remembers or has ready access to the numbers) cuts into the likelihood that the caller will make the calls. The caller may just not be as motivated to make the second call as a member of the group: "mothers with grown children who allegedly never call their mothers."If the caller is not motivated enough to overcome the inconvenience by making more than one call, the person will miss the call. The person is out of touch, at least with respect to that caller.

To keep better in touch and to avoid missing a call, a person generally distributes his or her telephone number, and if so equipped, his or her mobile telephone number. This distribution may be as simple as orally informing all would-be callers of these numbers. To a business person, this distribution may be as complicated as sending out flyers, passing out business cards, posting notices, etc. To a limited extent, this distribution of numbers helps the person to keep in touch. The extent to which this helps a person avoid missing calls depends on whether would-be callers retain the distribution of information and whether would-be callers use such a distribution. The flyers, business cards and notices may wind up in the would-be callers' recycle bins, or be misplaced, or be inconveniently stored.

Of course, the person's pertinent numbers may change. For example, a person who subscribes to mobile telephone service from a particular service provider may switch to another service provider for a whole host of reasons: better service; less expense; etc. The switch to another service provider typically results in a change in the mobile telephone number. Thus, to keep in touch and to avoid missing a call, the person has to distribute the new number. As before, this distribution may be as simple as orally informing all would-be callers of these numbers. On the other hand, this distribution may be as complicated as having to send out new flyers, print and pass out new business cards, post new notices, etc. Whether it's a simple distribution of the new mobile telephone number or a complicated distribution, or somewhere between, the change in the mobile telephone number results in a hassle. The person may not have distributed the new number to all would-be callers; or the would-be callers may have forgotten or lost the new number; or the would-be callers may continue to call the old number. The person may miss a call and be out of touch for an initial period until the change takes hold. This hassle is inconvenient and annoying. This hassle may be enough of an impediment to prevent a person from taking advantage of better service or less expensive service opportunities from a different service provider of mobile telecommunication service. In other words, this hassle in distribution of a new number may stifle competition in the provision of telecommunication services.

Whether it is an initial distribution of telephone numbers, or a distribution of new numbers, the distribution provides would-be callers with ready access to the person's pertinent telecommunication numbers. Using a person's business card with such number information, a would-be caller may try to reach the person by calling first one number, and if no answer is received, then by calling the other number. In other words, the would-be caller may have to make two calls to get in touch with the person. Thus, the distribution of the pertinent numbers by the person may resolve the difficulty that some would-be callers have in keeping track of a person's telephone number and mobile telephone number. However, the distribution does not affect the fact that a caller may have to make two or more calls (and repeat those calls) to track down a person. As noted, not all callers are motivated enough to overcome the inconvenience of making two or more calls. If the caller lacks such motivation, the person may miss the call. The person is out of touch, at least with respect to that caller.

The foregoing paragraphs have discussed some of the difficulties faced by a person in trying to keep in touch and to avoid missing calls in a telephone and mobile telephone environment. Telecommunication service providers share the concerns of their subscribers, but they, of course, have their own points of view. One interest of a mobile telecommunication service provider is to increase air time usage of a mobile telephone by a subscriber. Generally, the fees for mobile telecommunication service are based on such air time usage. So, more air time usage means more fees for the service provider. Thus, such a service provider is interested in minimizing the inconvenience to would-be callers in placing calls to mobile telephones and promoting the increased use of mobile telephones by subscribers. Given the cost of mobile telephone service and the existing conventional telephone plant, it is unrealistic to expect the public to switch over completely to the use of mobile telephones. Nevertheless, it is in the interests of mobile telecommunication service providers to increase the probability that a person's mobile telephone is used for as much of the person's telecommunication needs as possible.

Accordingly, with respect to mobile telecommunication service providers, there is a need for a system that promotes increased air time usage of a mobile telephone by a subscriber. There is an additional need for a system that promotes competition in the provision of mobile telephone service by making it more convenient for persons to change mobile telecommunication service providers.

Additionally, with respect to subscribers of telecommunication services, there is a need for a system that allows people to keep in touch with others and to avoid missing communications. In particular, there is a need for a system that minimizes the amount of information a person has to distribute with respect to a person's telecommunication devices. For example, there is a need for a system that allows a person to distribute a single number rather than both a telephone number and a mobile telephone number. As another example, there is a need for a system that obviates the necessity of distributing a new number when a person changes from one provider of mobile telecommunication service to another such provider.

Further, there is a need for a system that eliminates the inconvenience to would-be callers of trying to reach a person with a telephone and a mobile telephone. For example, there is a need for a system that eliminates the necessity of having to place separate (and possibly repeated) calls to a person's telephone number and a person's mobile telephone number in order to finally reach the person.

SUMMARY OF THE INVENTION

The present invention satisfies the needs in the art explained above in that the present invention relates to a method and system for providing a telecommunication extension service. Particular advantages of the present invention are set forth below at the conclusion of this summary.

Stated generally, one method of the present invention provides telecommunication extension service to a subscriber who has a first and second unit for use in keeping in touch through telecommunication. Upon receipt of a communication directed to the number associated with the one of the units, the method checks whether the other unit is available to receive the communication. If the second unit is available, then ringing is provided to both units. If either unit is answered, then the communication is connected to the answered unit. The other unit is provided with ringing for a predetermined number of rings or for a preselected amount of time so that the other unit may be answered within the predetermined number of rings or the preselected amount of time. If the other unit is answered, then the communication is connected to the other unit, whereby the communication is connected to both units.

An embodiment of the method of the present invention provides that if either unit is answered in response to the ringing before the other unit, then, as noted above, the communication is connected to the answered unit. However, in this embodiment, the ringing to the other unit is discontinued, whereby the communication is connected only to the answered unit and the other unit may not be answered after the connection of the communication to the answered unit. Another feature that may be included in the method of the present invention is that ringing to the other unit may be discontinued in response to receiving an indication from the answered unit to discontinue the ringing.

The preferred method includes additional steps such as monitoring a communication that is connected to both units for the drop-out of one of the units. In response to detecting the drop-out of one of the units, the communication is disconnected from the unit that dropped out, whereby the communication remains connected only to the unit that has not dropped out.

Another embodiment of the method of the present invention provides that the unanswered (or unconnected) unit may be used as a telecommunications device even if the answered unit is connected to a communication. For example, if a second communication is received with this second communication being directed to a number associated with the unanswered (or unconnected) unit, then the second communication may be routed to this unit. In this manner, a different communication may be connected to each of the units. As another example, if somebody wants to make a telephone call on one of the units, the person may make the call even if the other unit is connected to a communication. For example, an indication (such as a flash hook) may be received from the unit that's not in use with respect to the placement of a communication from that unit. In response thereto, the communication may be routed from the other unit, whereby the second communication is connected from the other unit while the first communication remains connected to the answered unit.

Advantageously, the present invention also includes a system for providing a telecommunications extension service to a subscriber. The system includes a switch, and first and second programmable network elements. In the preferred embodiment, the first programmable network element is a service control point, and the second programmable network element is a services node. In this system, in response to the receipt of a communication directed to a number associated with a subscriber's telecommunications unit, the switch suspends the processing of the communication, and requests communication processing instructions from the first programmable network element. The first programmable network element checks whether a second unit associated with the subscriber is available for receipt of the communication. If the second unit is available, the first programmable network element provides the communication processing instructions to the switch. The communication processing instructions include a direction to route the communication to the second programmable network element. The switch responds to the communication processing instructions by routing the communication to the second programmable network element. In response, the second programmable network element sets up a first leg of a conference call from the communication to the first unit, and sets up a second leg of the conference call from the communication to the second unit. The second programmable network element also causes ringing to be provided to the first unit and the second unit.

In the preferred embodiment of the system of the present invention, the second programmable network element is operative to detect whether either unit is answered in response to the ringing. If a unit answered, then the communication is connected to the unit that answered. The second programmable network element further provides that ringing is continued to the other unit for a predetermined number of rings or for a preselected amount of time so that the other unit may be answered within the predetermined number of rings or the preselected amount of time. If the other unit is answered, then the second programmable network element connects the communication to the other unit, whereby the communication is connected to both units.

In an embodiment of the system, if one of the units is answered, then the communication is connected to the answered unit, and the ringing to the other unit is discontinued, whereby the communication is connected only to the answered unit, and the other unit may not be answered after the connection of the communication to the answered unit. Another feature that may be present in an embodiment of the system is the action of the second programmable network element to respond to receipt of an indication from the answered unit to discontinue the ringing by providing that the ringing be discontinued to the other unit.

In another embodiment of the system, if the communication is connected to both units, then the second programmable network element monitors the communication for the drop-out of one of the units. If a unit drops out, then the communication is disconnected from the unit that dropped out, whereby the communication remains connected to the unit that did not drop out.

In the preferred embodiment of the system, one of the units of the subscriber is a wireless unit. In this embodiment, the first programmable network element is directly connected to a home location register via a data link. When the first programmable element is to check whether the wireless unit is available, the first programmable network element formats a request for availability information relating to the wireless unit in a wireless network protocol. The first programmable element then sends the request for the availability information over the data link that directly connects the first programmable network element and the home location register. In response, the home location register sends the availability information over the data link to the first programmable network element. Based on the availability information, the first programmable element provides the switch with communication processing instructions.

A particular aspect of the present invention includes a method for checking the availability of a wireless unit to receive a communication. In this method, a communication is received at a service switching point. The service switching point suspends the processing of the communication, and launches a query to a service control point for communication processing instructions. In response to the query, the service control point checks whether the communication is directed to a wireless number associated with the wireless unit. If the communication is directed to the wireless number associated with the wireless unit, then the service control point formats a request for availability information relating to the wireless unit in a wireless network protocol. The service control point also sends the request for the availability information over a data link that directly connects the service control point and a home location register. In response to the request for the availability information, the home location register sends the availability information over the data link to the service control point. In response to receipt of the availability information, the service control point provides the service switching point with the communication processing instructions.

The above-described method for checking the availability of a wireless unit to receive a communication may also include the following steps. Prior to providing the service switching point with the communication processing instructions, and in response to receipt of the availability information, the service control point may examine the content of the availability information. The service control point then may base the content of the communication processing instructions on the content of the availability information. In addition, prior to causing the service control point to provide the service switching point with the communication processing instructions, and in response to receipt of the availability information, the service control point may examine the content of the availability information. If the content indicates that the wireless unit is available, then the service control point may instruct the service switching point in the communication processing instructions to route the communication to the wireless unit. Alternatively, prior to providing the service switching point with the communication processing instructions, and in response to receipt of the availability information, the service control point may examine the content of the availability information. If the content indicates that the wireless unit is unavailable, then the service control point may instruct the service switching point in the communication processing instructions to provide the caller with notice that the wireless unit is unavailable.

Advantageously, the present invention provides telecommunication extension service to a subscriber who has two or more telecommunication units. Pursuant to this service, notice of a communication directed to one of the units is provided by ringing both (or all) of the units. The subscriber may receive and respond to the communication through use of any of the units. Advantageously, the use of one or more telecommunication units (each with their own numbers) as extensions to a specified telecommunication unit selected by the subscriber allows the subscriber to receive calls directed to the subscriber's selected unit by answering such calls on the other units. The use of an extension unit to a selected unit allows the subscriber freedom to move away from the location of the selected unit without missing calls. The telecommunication extension service makes it easy to contact a subscriber. Callers are not inconvenienced by having to make a call to each of the subscriber's different telecommunication units. One call does it all.

Another advantage of the present invention is that to keep in touch and to avoid missing calls, the subscriber distributes only a minimal amount of information. The subscriber does not have to provide would-be callers with any more information than the number for the subscriber's selected telecommunications unit. The telecommunication extension service makes it easy to contact a subscriber. Would-be callers do not have to keep track of a lot of different numbers and other information. With the preferred embodiment of the present invention, a call to the subscriber's selected unit, reaches the subscriber's other unit(s) if the telecommunication extension service is enabled and the other unit(s) are available to receive calls. By obviating the need to provide would-be callers with additional telephone numbers (such as the subscriber's mobile telephone number, etc.), the subscriber is free to change his or her numbers or to change a subscription to a different mobile telephone service provider without worrying about updating would-be callers with all the relevant numbers.

While the preferred embodiment of the present invention is disclosed in the context of a telecommunication service that allows a wireless unit to be used as an extension to a wireline unit, those skilled in the art will appreciate that the principles of the present invention may be applied so as to provide alternate telecommunication services based on the principles described in the context of the preferred embodiment. In particular, the present invention provides for an alternate telecommunication extension service that allows any type of unit (wireless or wireline) to be used as an extension to any other type of unit (wireless or wireline). Further, more than one unit (and units of different types) may be used as extensions to any other type of unit. Advantageously, these alternate extension services provide a subscriber great flexibility and choice with respect to the delivery of telecommunications service, and increase subscriber satisfaction. Increased subscriber satisfaction is a principal goal of a service provider in the increasingly competitive field of telecommunications.

Therefore, it is an object of the present invention to provide an improved telecommunication extension service.

It is also an object of the present invention to provide a system and method that promotes increased air time usage of a mobile telephone by a subscriber.

It is an additional object of the present invention to provide a method and system that promotes competition in the provision of mobile telephone service by making it more convenient for persons to change mobile telecommunication service providers.

It is further object of the present invention to provide a method and system that allows people to keep in touch with others and to avoid missing communications.

It is also an object of the present invention to provide a system and method that minimizes the amount of information a person has to distribute with respect to a person's telecommunication devices.

It is an addition object of the present invention to provide a method and system that allows a person to distribute a single number rather than both a telephone number and a mobile telephone number.

It is a further object of the present invention to provide a method and system that obviates the necessity of distributing a new number when a person changes from one provider of mobile telecommunication service to another such provider.

It is also an object of the present invention to provide a system and method that eliminates the inconvenience to would-be callers of trying to reach a person with a telephone and a mobile telephone.

It is a further object of the present invention to provide a method and system that eliminates the necessity of having to place separate (and possibly repeated) calls to a person's telephone number and a person's mobile telephone number in order to finally reach the person.

That the present invention and the preferred embodiment thereof overcome the drawbacks set forth above and accomplish the objects of the invention set forth herein will become apparent from the detailed description of the preferred embodiment to follow.

BRIEF DESCRIPTION OF THE DRAWINGS

FIG. 1 is a diagram of the preferred embodiment of the present invention in its preferred environment.

FIG. 2 is a diagram of another embodiment of the present invention in an alternative environment.

FIG. 3 is a diagram of yet another embodiment of the present invention in yet another alternative environment.

FIGS. 4A and 4B are flow diagrams illustrating a preferred operation of the present invention.

FIG. 5 is a flow diagram indicating a preferred operation of the present invention.

DETAILED DESCRIPTION

Figure 4B:
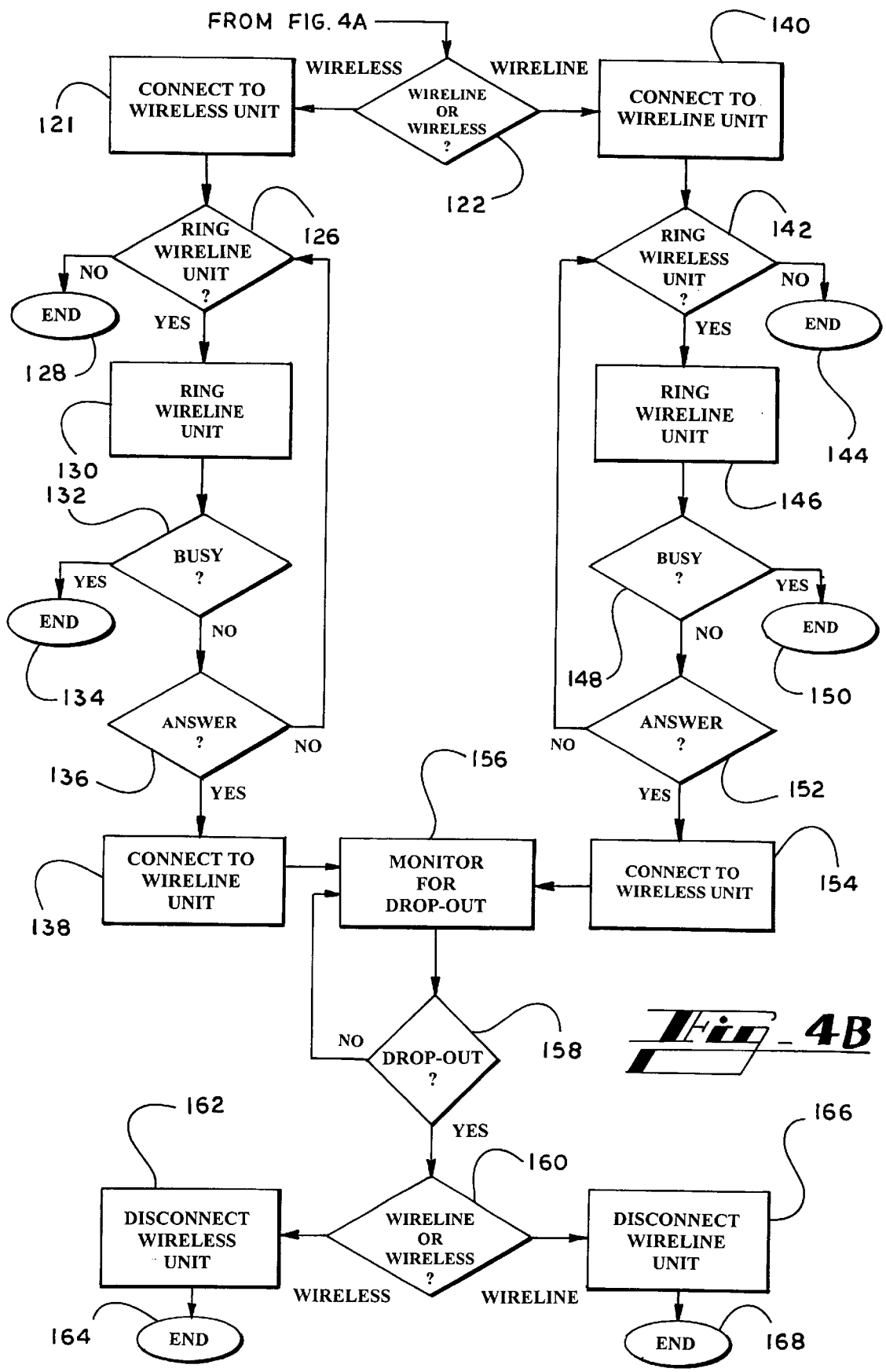

This detailed description first provides an overview of the preferred embodiment of the present invention. Then a description of the preferred environment and the operation of the preferred embodiment is provided with reference to FIG. 1. Alternate embodiments of the present invention are described with reference to FIGS. 2 and 3. Finally, with reference to FIGS. 4A and 4B, a flow diagram is used to provide a summary of the operation of the preferred embodiment.

Overview of the Preferred Embodiment

Generally, the preferred embodiment of the present invention provides wireless telecommunication extension service to a subscriber who has a wireline unit and a wireless unit. Pursuant to this service, notice of a communication directed to the wireline unit is provided by ringing both the wireline unit and the wireless unit. The subscriber may receive and respond to the communication through use of either the wireline unit or the wireless unit. Advantageously, the subscriber may respond to the communication on one of the units and another party may respond to the same communication on the other unit. The result is that the subscriber and the other party are connected as a conference call to the communication such that the subscriber, other party and caller may all engage in the communication. Another advantage of the present invention is that the service may monitor the conference call for the drop-out of one of the units. In response to detecting such a drop-out, the service disconnects the communication from the unit that dropped out such that the communication remains connected to the other (non-drop-out) unit. In other words, the service breaks down the conference call in such a manner that such breakdown of the conference call is virtually transparent and un-interruptive to the caller and the party that has not dropped out. They may continue to engage in their communication.

The wireless telecommunication extension service of the present invention may also provide a disconnection feature with respect to use of one of the units during any particular communication. Per this feature, once the subscriber (or another party) responds to the communication on one of the units, then the subscriber may provide an indication to the service to disconnect the ringing or the communication from the other unit. This feature demonstrates yet another advantage of the present invention. The subscriber may prevent the other unit from being picked up and a conference call being established with respect to the other unit. This feature saves time and effort because it provides an indication that the communication has already been taken care of, and that another party need not respond to the communication on the other unit. This feature also allows a party responding to the communication to disconnect an answering machine that may have responded to the communication on another unit.

In addition, the wireless telecommunication extension service of the present invention allows the units that are part of the service to continue to fully function as telecommunication units when they are not being used as part of a conference call with one or more of the other units. In other words, if a conference call is not in progress, then any of the units may be used to make and receive calls, just as if they were not part of the service. For example, if a subscriber is engaged in a telephone conference on the wireline unit, another party may use the wireless unit for other telecommunication purposes, and vice versa.

It will be appreciated that the wireless telecommunication service of the present invention will not interfere with other telecommunication services such as call forwarding service and caller identification service and with telecommunication devices such as answering machines and facsimile machines, except as noted herein. The manner of use of the present invention in connection with these other telecommunication services and telecommunication devices will be apparent to those skilled in the art given the principles of the present invention.

The preferred embodiment of the present invention is disclosed in the context of a telecommunication service that allows a wireless unit to be used as an extension to a wireline unit. For the sake of clarity in the description of the preferred embodiment, reference is made to a single wireline unit and a single wireless unit, but the present invention is not so limited. Those skilled in the art will appreciate that the principles of the present invention may be applied so as to provide alternate telecommunication services based on the principles described in the context of the preferred embodiment. In particular, the present invention provides for an alternate telecommunication extension service that allows any type of unit (wireless or wireline) to be used as an extension to any other type of unit (wireless or wireline). Further, more than one unit (and units of different types) may be used as extensions to any other type of unit. Advantageously, these alternate extension services provide a subscriber great flexibility and choice with respect to the delivery of telecommunications service, and increase subscriber satisfaction. Increased subscriber satisfaction is a principal goal of a service provider in the increasingly competitive field of telecommunications.

The Preferred Environment of the Preferred Embodiment

Referring now to the drawings, in which like numerals indicate like elements throughout the several figures, FIG. 1 is a diagram of the preferred environment of the present invention. The preferred environment is a telecommunications system 10 that includes the public switched telephone network (PSTN) 12 and a wireless telecommunications network 14. (also referred to as a wireless network, or a wireless phone network).

The Public Switched Telephone Network

In the preferred embodiment, the public switched telephone network 12 contains Advanced Intelligent Network (AIN) elements of a typical local exchange carrier. The Advanced Intelligent Network comprises a plurality of end or central offices, which are indicated as end offices 16a, 16b in FIG. 1. Preferably, each end office includes an "SSP", which is an acronym for service switching point. A service switching point is a switch, and the terms "end office", "central office", "service switching point" and "SSP" are used interchangeably herein unless a distinction is noted based on the interaction of the element with the present invention. In the preferred embodiment, the service switching point is equipped with AIN software release 0.1 or higher release. For more information, see BellCore Specification TR-NWT-001284 Switching Systems Generic Requirements for AIN 0.1, which is incorporated herein by reference. The broken line between the end offices 16a, 16 indicates that the number of end offices is arbitrary. The Advanced Intelligent Network also comprises non-SSP central office switches, but such non-SSP switches are not shown in FIG. 1. The difference between an SSP and a non-SSP switch is that an SSP includes intelligent network functionality including appropriate hardware and software so that, when a set of predetermined conditions are detected, the SSP initiates a trigger for a predetermined state of a call on a subscriber's directory number, generates the trigger as an appropriate message in the form of a query to be sent out over the network, and suspends handling of a call until the SSP receives a reply from the network instructing the SSP to take certain action. If the SSP receives no instructions within a certain amount of time, the SSP has a default task to execute with respect to the predetermined condition. A non-SSP switch is an electronic switch that can generate certain rudimentary signaling over the network, but the non-SSP switch must rely on other equipment to provide subscriber lines connected to such a non-SSP switch with more complex features and services available in the Advanced Intelligent Network.

As further illustrated in FIG. 1, SSP switches 16a, 16b have a plurality of subscriber lines commonly designated as 18 connected thereto. Each subscriber line 18 is connected to a piece of terminating equipment including a plurality of telephones commonly designated as 20. Although telephones are illustrated as the pieces of terminating equipment in FIG. 1, those skilled in the art will understand that such pieces include other telecommunication units or devices such as facsimile machines, computers, modems, etc. For purposes of this patent application, these telephones and other telecommunication devices are generally referred to as wireline units for the obvious reason that these devices are connected by subscriber lines to the PSTN. The term "wireline" is used herein synonymously with the term "landline" unless specifically noted. In addition, the telephones 20 serve to illustrate that these subscriber lines 18 and pieces of terminating equipment 20 represent lines and equipment that exist in a conventional manner within the network and that operate with the present invention, but that are not necessarily connected to SSPs 16a, 16b.

One of the illustrated telephones 20a is designated as corresponding to the calling party. The term "calling party"

is used herein generally to refer to the person or device that initiates a communication. The calling party is also referred to herein as "caller" or as "source". In some cases, the calling party may not be a person, but may be a device such as a telecommunications device including a facsimile machine, answering service, modem, etc.

Two of the illustrated telephones 20e and 20f are illustrated as located within the same environment 22 such as a home or office and/or as served by the same subscriber line 18e from end office 16b. It is further contemplated that the two telephones 20e and 20f are served by the same telephone number (also referred to as "directory number"). In other words, the home or office environment 22 is served by a subscriber line 18e with two telephone extensions 20e, 20f. Those skilled in the art will appreciate that the present invention may be implemented with terminating devices or systems other than the telephones 20e, 20f as the devices associated with the called party. For example, with modifications that will be apparent to those skilled in the art, the present invention may be implemented with facsimile machines, modems, direct-inward-dial (DID) systems, and other systems used generally in homes and businesses, and with modifications, with public branch exchange (PBX) systems.

The telephones 20e, 20f are further designated as corresponding to the called party. The term "called party" is used herein generally to refer to the person or device that answers or responds to the call or communication. The term "subscriber" is also used synonymously herein to refer to the "called party" unless a difference is noted. Of course, the called party need not necessarily be the subscriber of the service, nor the party nor device whom the caller is trying to reach.

Pursuant to the preferred embodiment, each piece of terminating equipment in an Advanced Intelligent Network is assigned a directory number. In the description of the present invention, the term "directory number" is used in its generally understood meaning to be the number which is dialed or input by a caller or source and used by the network to route the communication so as to reach a piece of terminating equipment associated with the dialed directory number. A directory number is commonly referred to as a telephone number. It should be noted that a piece of terminating equipment's directory number is not necessarily unique, but may be shared by a group of pieces of terminating equipment such as telephone extensions 20e, 20f. For example, it is likely that the several telephones in a home are all served by the same subscriber line and so have the same directory number. Thus, a call to a directory number assigned to the subscriber line that terminates at the home may be conveniently answered at any of the telephones in the home. In the present application, the term "terminates" is used with the terms "call" or "communication" pursuant to their meaning in the field of telephony to mean an ultimate connection of a call or connection to equipment associated with the called party.

Switches 16a, 16b are interconnected by a plurality of trunk circuits. These are the voice path trunks that interconnect the central office switches to connect communications. The term "communication" is used herein to include all messages or calls that may be exchanged between a caller and a called party in the system illustrated in FIG. 1 including voice, data and video messages. The term "communication" is used synonymously herein with the term "call" unless a distinction is noted. It should be understood that central office trunking in a typical urban environment is not limited to a daisy chain arrangement implied by FIG. 1.

In other words, in a typical network, trunk circuits exist between central office switch 12a or 12b and the central office switch(es) (not shown) servicing other pieces of terminating equipment.

Each of the SSPs in the network including switches 16a, 16b is typically connected to a local signal transfer point (STP) (not illustrated) via respective data links. These data links employ a signaling protocol referred to as Signaling System 7 (SS7), which is well known to those skilled in the art.

Much of the intelligence of the Advanced Intelligent Network resides in a local service control point (SCP) 24. Typically, an SCP is connected to one or more SSPs through a respective one or more STPs over SS7 data links. For the sake of simplicity, in FIG. 1, SCP 24 is illustrated as connected to end office 16b over an SS7 data link 26 as indicated by the dashed line. Among the functions performed by SCPs is the maintenance of network databases which are used in providing telecommunication services. In addition, SCPs include databases such as the illustrated subscriber information database 28 that identify particular service subscribers and the services to be accorded to these subscribers.

In order to keep the processing of data and calls as simple as possible, a relatively small set of triggers is defined at the switches for each call. A trigger in the Advanced Intelligent Network is an event associated with a particular subscriber line that generates a packet to be sent to an SCP. The trigger causes the SCP to query its database to determine which customized calling feature or enhanced service should be implemented for this particular call. The results of the database inquiry are sent back to the switch from SCP 24. The return packet includes instructions to the switch as to how to process the call. The instruction may be to take some special action as a result of a customized calling service or enhanced feature. In response to receiving the latter type message, the switch moves through its call states, and generates further call signaling messages that are used to set up and route the call.

As also illustrated in FIG. 1, an Advanced Intelligent Network typically (in the AIN 0.2 software release) includes a telecommunications element referred to as a services node 30 (SN). Those skilled in the art will be familiar with a services node, which is physically implemented by the same types of computers that embody the service control point 24. In addition to the computing capability and database maintenance features, services node 30 also includes switching fabric, voice and DTMF signal recognition devices and voice synthesis devices.

Although services node 30 is physically quite similar to SCP 24, there are some important differences in the use to which the services node 30 is generally put. Service control points such as SCP 24 normally implement high volume routing services such as call forwarding and 800 number translation and routing. They are also used for maintenance of and providing access to high volume databases for authorization of billing, such as credit card number validations. In most local exchange carrier networks, service control points are only used for database lookup and routing services that take place prior to the connection of the call.

In contrast, services nodes are used principally when some enhanced feature or service requires user interaction, an audio connection to the call or transfer of a significant amount of data to a subscriber over a switch connection during or following a call. A services node also is used in routing and setting up communications such as conference calls as is described in more detail below. A services node is typically connected to one or more switches via an integrated services digital network (ISDN) link. For example, FIG. 1 illustrates that services node 30 is connected to end office 16b. Thus, services that require real-time communication with a subscriber (or calling or called party) during a communication usually employ the facility of a services node such as services node 30.

As is well known to those skilled in the art, the Advanced Intelligent Network may also include other elements and connections that have not been described herein unless their form or function is affected as a result of the implementation of the present invention in the AIN.

The foregoing description is a basic overview together with a few examples of the operation of the Advanced Intelligent Network that is a modern public switched telephone network. In summary, the AIN is a complex, high-speed, high-traffic-volume packet-switched messaging arrangement that provides a great deal of versatility in the handling of telecommunications.

The Wireless Network

As noted supra, the preferred environment is a telecommunications system 10 that includes the public switched telephone network 12 (described generally above) and a wireless network 14. The distinguishing feature of a wireless network is obvious from the nomenclature of "wireless". The terminating equipment in a wireless network is "wireless" in the sense that the equipment is not connected by any lines or wires to network elements. The terminating equipment in a wireless network (referred to herein as "wireless units") receive communications through radio signals rather than through copper wire or fiber optics. A cellular telephone network is an example of a wireless network. Thus, a "wireless unit" may be generalized to include a cellular telephone, a mobile telephone, a mobile station, a portable telephone and other devices that receive communications through radio signals rather than through copper wire or fiber optics. Even though a cellular mobile radiotelephone (CMR) system is used as an example in this detailed description, it should be noted, however, that the use of the present invention is not limited to a CMR system. The present invention also may be used in connection with the Future Public Land Mobile Public Telephone Service (FPLMTS), Personal Communication Services (PCS's) and Enhanced Specialized Mobile Radio services (ESMR's), and other wireless systems.

As illustrated in FIG. 1 and as will be well known to those skilled in the art, the PSTN 12 is connected to the wireless network 14 through an access tandem 32. The connection of the PSTN 12 to the wireless network 14 through an access tandem 32 (or similar network element) allows for the interconnection of these two communication systems. Such interconnection is necessary so that a call from a wireline unit such as telephone 20a may be connected to a wireless unit such as mobile telephone 34.

Also as is well known to those skilled in the art, a wireless network includes a geographic radio service area divided into cells. Each cell is generally serviced by a broadcast antenna to permit communications between a wireless unit operating within the area of the cell and a cell control. The cell control, in turn, is connected to a wireless network switch (also referred to as a "mobile switching center" (MSC)). A wireless network switch may communicate with the cell control either through dedicated telephone facilities, or more frequently, through a cell-to-mobile switching center data link between the cell control and the MSC.

Generally, a wireless network switch keeps up with the location of wireless units that are deemed to be associated with that switch such that the switch is able to provide information with respect to the location and/or availability of any particular unit to receive a communication. More particular stated, the active status or availability of a wireless unit in a particular area is typically made known to the relevant wireless network switch as a result of a communication process between a wireless unit and a cell control (also known as a "base station") that is commonly known in the art as the process of "registration". Once a wireless unit registers within the geographic area served by a wireless network switch, the switch receives the registration information from the cell control, and stores the pertinent information in a register. If a wireless unit is associated with a subscriber of that particular wireless network, then the registration information is stored in a home location register (HLR). In other words, the wireless unit is considered to be operating within its home territory. On the other hand, if the wireless unit is not associated with a subscriber of that particular wireless network, then the registration information is stored in a visitors' location register (VLR). In other words, the wireless unit is considered to be a visitor to the geographic area serviced by the wireless network switch. If necessary, the pertinent information relating to a particular wireless unit is based through the wireless network to the wireless network switch that is deemed to be the "home" switch of a particular unit. These registers, the home location register (HLR) and the visitors' location register (VLR), are used by the wireless network in any of several different manners well known to those skilled in the art to work with the public switched telephone network in the routing of communications to and from wireless units and through the PSTN.

FIG. 1 illustrates only the basic elements of a wireless network 14 necessary to the understanding of the operation of the present invention. As illustrated in FIG. 1, wireless network 14 is connected to the PSTN 12 by a connection between access tandem 32 and wireless network switch 36. The switch 36, in turn, is connected to an antenna 38, which transmits and receives information (and hence, communications) from wireless network switch 36 and a wireless unit 34. As illustrated in FIG. 1, wireless network switch 36 includes a register 40, which is illustrated as a home location register (HLR), but may also include or alternatively only include a visitors' location register (VLR). Also, the registers may located in other wireless network elements such as a mobile switching center (MSC). The home location register 40 is connected by an SS7 data link that uses wireless network protocols such as IS-41 or GSM-MAP to a service control point 24 in the public switched telephone network 12. As will become clear from the description below of the operation of the present invention, the data link between the register 40 and the service control point 24 provides certain advantages. Through this data link, the service control point can quickly check with the wireless network 14 with respect to the activity and or availability of any particular wireless unit operating within the area served by the wireless network.

For the sake of simplicity, the foregoing descriptions of the public switched telephone network 12 and wireless network 14 were limited to only single or very few examples of particular network elements and their respective interconnections. From this basic explanation of these network elements and their respective interconnections, those skilled in the art will understand the operation of the present invention in the context of the increased complexity present in today's telecommunication systems.

Operation of the Preferred Embodiment in the Preferred Environment

As noted above, the present invention generally provides wireless telecommunication extension service to a subscriber who has a wireline unit and a wireless unit. In other words, the present invention turns the subscriber's wireless unit into an extension of the wireline unit just as if the wireless unit were another wireline extension. A general example is provided with reference to FIG. 1. If Doug wants to call his friends, Carl and JoAnn, Doug may use his telephone 20a and dial Carl's and JoAnn's directory number for Carl's and JoAnn's wireline telephone: 404-845-1234. In the prior art, one result of this calling is that the telephones 20e, 20f ring in the home 22 of Carl and JoAnn. It may be that both Carl and JoAnn are available to take the call, and they may both speak to Doug by the respective use of the telephones 20e, 20f.

The present invention does not change this scenario, but rather, the present invention provides an additional service. Per the preferred embodiment of the present invention, Doug's dialing of Carl's and JoAnn's directory number for their wireline unit results in the ringing of both the wireline units associated with Carl and JoAnn and of the wireless unit associated with Carl and JoAnn. Thus, assume Carl is at home and JoAnn is out on a sales trip, but her mobile telephone 34 is active. Then Doug's dialing of Carl's and JoAnn's directory number results in the ringing of the wireline units 20e, 20f and of the wireless unit 34. If Carl and JoAnn answer the ringing of the units, then Doug is able to have a conference call with both Carl and JoAnn even though JoAnn is "on the road". Doug has reached both parties, but has only dialed the wireline directory number. Doug's call to Carl and JoAnn is used repeatedly through this detailed description to better illustrate the preferred embodiment of the present invention.

A more detailed explanation of the operation of the present invention is now provided with reference to the network elements of the PSTN 12 and wireless network 14. To initiate the wireless telecommunication extension service, a subscriber preferably provides the service provider with certain information. This information must include the wireline number of the wireline unit to be accorded the wireless telecommunication extension service and the wireless number of the wireless unit that is to serve as the extension. For example, when Carl and JoAnn subscribed to wireline extension service, they provided the system administrator with their wireline unit's directory number (404-845-1234) and with JoAnn's mobile telephone number (404-999-6789). This information is provided ultimately to the SCP 24 where the information is stored in a manner well known to those skilled in the art in a database 36 that may be accessed by the SCP 24. Alternatively, this information may be provided to the services node 30 where the information is stored in a manner well known to those skilled in the art in a database (not shown) that may be accessed by the services node 30. Preferably, the subscriber may change or update the information with respect to the operation of the wireless telecommunication extension service, such as a change in the wireline number to be accorded the service, or a change in the wireless number and that is to serve as the wireless extension. Such changes or updates may be made through a call to an administrative telephone number associated with the service and the provision of information in response to menu prompts. This flexibility in the change or update of service information provides the subscriber with the opportunity to readily change the service parameters to take into account any changes made by the subscriber in connection with his/her telecommunication services.

As a result of the subscription to the wireless telecommunication extension service, the service provides that a terminating trigger is associated with the wireline number designated by the subscriber. When the end office serving the subscriber receives a communication for the wireline number, the end office pauses or suspends its processing of the communication directed to the wireline number while the end office obtains further information with respect to such communication processing. For example, when a communication is directed to 404-845-1234 reaches the end office 16b associated with Carl's and JoAnn's subscriber line, the end office 16b notes the terminating trigger associated with Carl's and JoAnn's wireline number. The end office 16b pauses or suspends its processing of the communication and requests communication processing instructions from a first programmable network element by sending a query to the switch's 16b associated SCP 24.

In response to the request for the communication processing instructions, the SCP 24 consults its database 36 for further information with respect to the communication. In particular, the SCP 24 checks its database 36 to determine whether special services are to be accorded to the communication. If the check of the database 36 reveals that no special services such as wireless telecommunication extension services are to be accorded to the communication, then the SCP 24 provides the end office 16b with instructions to terminate the communication in a conventional manner.

Enablement and Disenablement of the Wireless Telecommunication Extension Service By the Subscriber It should be noted that a feature of the preferred embodiment of the present invention is that the subscriber may selectably enable or disable the wireless telecommunication extension service. To enable the service (or to disable if the service has already been enabled), the subscriber calls an administrative number for the service and provides certain information in response to certain menu prompts. The information is used to update the information at the SCP 24 with respect to the enablement or disenablement of the wireless telecommunication extension service. Thus, in the preferred embodiment, the check conducted by the SCP to determine whether special services are to be accorded to the communication includes a check of whether wireless telecommunication extension service for the wireline number has been enabled. If not, the communication is terminated in a conventional manner to the wireline unit.

Referring again to the check carried out by the SCP 24 with respect to its database 36, if the check of the database 36 reveals that the subscriber has subscribed to the wireless telecommunication extension service (and/or that the service is enabled), then the SCP 24 takes certain further steps. Once the SCP 24 determines that the wireline number is to be accorded wireless telecommunication extension service, the first step that the SCP 24 takes is to check whether the wireless unit is available to receive the communication, i.e., whether the wireless unit is available to act as an extension to the wireline unit. An "available" wireless unit generally is a unit that is active or "ON". In an alternate embodiment, a feature may be provided that checks whether the mobile telephone is engaged, i.e., busy.

In an alternate embodiment of the present invention, prior to checking whether the wireless unit is available to receive the communication, the SCP 24 may check with end office 16b as to whether the wireline unit is busy. If the wireline unit is not busy (or otherwise engaged), then the provision of wireless telecommunication extension service is provided in accordance with the preferred embodiment described below. However, in this alternate embodiment, if the wireline unit is busy, then the SCP 24 may proceed with checking whether the wireless unit is available. If the wireline unit is busy, but the wireless unit is available, then the SCP 24 may direct the end office 16b to route the communication to the wireless unit without regard to the steps described below in connection with the placement of a call to the wireline unit. In this alternate embodiment, with the wireline unit busy, but with the wireless unit available, the wireless unit advantageously functions analogously to another line rather than as an extension of the wireline unit. Referring to our example, if Doug calls 404-845-1234, but Carl is using the wireline unit for a telephone call, then Doug's call may be routed to JoAnn on the wireless unit, if it is active.

Checking Whether the Wireless Unit Is Available

Referring again to the preferred embodiment, as noted, one of the first steps that the SCP 24 takes is to check whether the wireless unit is available to receive the communication. In sum, if the wireless unit is available, then the SCP provides communication processing instructions to said switch. Preferably, the communication processing instructions will include a direction to route the communication to a second programmable network element such as the service node 30.

The particular steps preferably taken by the service control point 24 in checking whether the wireless unit is available are now described in more detail. As a result of subscription to the wireless telecommunication extension service, the SCP 24 preferably will have stored in its database 36 the wireless number provided by the subscriber of the wireless unit that is to serve as the extension to the wireline unit. The SCP 24 carries out this check as to the availability of the wireless unit by making an inquiry or request of the home location register (HLR) 40 in the wireless network switch 36 in the wireless network 14. Preferably, the SCP 24 formats this request for availability information relating to the wireless unit in a wireless network protocol such as IS-41 or GSM-MAP, which are well known to those skilled in the art.

In the preferred embodiment, SCP 24 sends an IS-41 location request message to the HLR 40 in order to determine the availability of the wireless unit 34. This inquiry is based on the wireless number of the wireless unit provided by the subscriber. The SCP 24 sends the request for the availability information over the data link that connects, and preferably, directly connects the SCP and the HLR, or to any other network element housing the home location register (HLR) 40. In other words, the wireline network and the wireless network are connected and communicate through this connection between the SCP and the HLR.

Upon receiving the inquiry from the SCP 24, the HLR 40 considers and acts on the inquiry from the SCP 24 just like any other inquiry that the HLR 40 might receive from another wireless network element with respect to the availability of a wireless unit 34. In other words, the communication between the wireline SCP 24 and the wireless HLR is conducted pursuant to the IS-41 standards well known in the art with respect to communications in wireless networks. Alternatively, as will be apparent to those skilled in the art, other wireless communication methods such as the Global System for Mobile Communications (GSMMAP) may be used as appropriate as the means of communication between SCP 24 and HLR 40 in order to determine the availability of the wireless unit 34. Nonetheless, other methods may be employed to determine whether the wireless unit is available. Further, it should be noted that inquiry of other registers and/or switches other than the switch or HLR to which the SCP is connected by a direct datalink may need to be consulted with respect to the availability of the wireless unit. For example, a visitors' location register in a switch of a wireless network foreign to the subscriber may need to be consulted in a manner well known to those skilled in the art to obtain information on the availability of the wireless unit. Alternatively, the SCP 24 may not be connected to an HLR 40 by a direct datalink, and the service may check the availability of the wireless unit through other means. Systems for tracking down the availability of a wireless unit, even when it is "roaming", for the delivery of a communication are well known to those skilled in the art.

Preferably, the HLR 40 responds to the inquiry or request for the availability information from the SCP 24 by sending the availability information over the data link to the SCP in an IS-41 response to location request message.

Upon receipt of the availability information from the HLR 40, the SCP 24 provides the switch 16b with communication processing instructions. In particular, the SCP 24 examines the content of the availability information and bases the content of the communication processing instructions on the content of availability information. If the content indicates that the wireless unit is unavailable, then the SCP 24 instructs the service switching point in the communication processing instructions to provide the caller with notice that the wireless unit is unavailable. In other words, if the results of the inquiry as to the availability of the wireless unit are negative, i.e., the wireless unit is "OFF" or "busy", then the SCP 24 sends instructions to the end office 16b to terminate the communication to the wireline unit associated with the wireline number in a conventional manner. Thus, referring to our example, if JoAnn is "on the road" and the wireless unit 34 cannot receive calls (i.e., it may be in use or the unit 34 is turned "OFF"), then any communication directed to Carl's and JoAnn's wireline number is terminated only to Carl's and JoAnn's wireline units 20e, 20f. In the preferred embodiment, the call may be bridged between the caller and the answering party so that these two parties have an indication of the state of the call to the third party. For example, if the wireless unit is busy, the caller and the answering party on the wireline unit may hear a busy signal. Alternatively, the caller and the answering party on the wireline unit may be provided with an announcement as to the status of the wireless unit. For example, the caller and answering party may be provided with an announcement that the wireless unit is "unavailable at this time".

On the other hand, if the content of the availability information from the HLR indicates that the wireless unit is available, then the SCP instructs the service switching point in the communication processing instructions to route the communication to the wireless unit. In other words, if the results of the inquiry as to the availability of the wireless unit are positive in that the unit may receive calls, (i.e., the wireless unit may be "ON") then the SCP 24 preferably provides the end office 16b with certain instructions. In the preferred embodiment, the SCP 24 provides the end office 16b with instructions to route the communication to the services node 30.

Alternate Embodiment Without a Service Control Point

Those skilled in the art will appreciate that the above described functions of the service control point in connection with the present invention may be carried out by other network devices and in other ways to accomplish the same result in the provision of telecommunication extension service. One such alternate embodiment does not involve the use of a service control point, but operates to include steps of another telecommunications service known to those skilled in the art as generally a "Teen Line" or "RingMaster" service. In particular, in this alternate embodiment, a subscriber is provided with two different directory numbers that each ring on the same line, but have their own characteristic rings. For example, a call directed to the first of these directory numbers may have characteristically long rings. A call directed to the second number may have short rings. In this manner, the subscriber knows which directory number is being used by the caller. This distinction provides the subscriber with information and allows the subscriber to answer or not answer the communication, or to answer in a certain manner or with certain personnel to the communication. Those skilled in the art will recognize such a service as a "Teen Line" service (where calls to a teen have a characteristic ring so that everybody else in the family may ignore the call), or as "RingMaster" service as offered by the assignee of this patent application, BellSouth Corporation, Atlanta, Ga. For simplicity of explanation, this service is referred to as "RingMaster" service in this patent application.

As stated, one method to eliminate the use of the service control point in connection with the present invention is through a use of the RingMaster service. A subscriber is provided with RingMaster service such that the subscriber is assigned two different directory numbers for the subscriber's wireline unit. For example, the subscriber's first directory number may be 845-1234 and the second (RingMaster) directory number may be 921-5555. The first directory number (845-1234) is set up administratively as the directory number that is to be accorded wireless extension telecommunication service. When a call directed to 845-1234 is received at the subscriber's end office, the receipt of the call results in the call being forwarded to a services node. For example, upon receipt of a call to 845-1234, end office 16b forwards the call to a directory number associated with the services node 30, such as 332-2111, and the call is routed to the services node 30. Upon receipt of the call, the services node 30 checks its database for instructions as to how to handle the call. The services node is programmed to dial the landline number (921-5555) and the mobile telephone number (999-6789). In other words, these instructions instruct the services node to set up the first leg of a conference call to the second directory number (921-555) and the second leg of the conference call to the number of the wireless extension unit through the wireless network.

Thus, this alternate embodiment provides the wireless telecommunication extension service to a subscriber without involving or burdening the service control point with additional duties. This is especially useful in situations where a service control point is unavailable. Advantageously, obviating the use of a service control point provides a service provider that is not a local exchange carrier (referred to herein as "other service providers") with the competitive opportunity to offer wireless telecommunication extension service. An other service provider may provide the wireless telecommunication extension service through use of the PSTN and its own services node. Nonetheless, this alternate embodiment provides advantages to subscribers. One such advantage is that the subscriber who hears the ringing of the wireline unit is alerted to the receipt of a call that has been accorded wireless telecommunication extension service. The subscriber is alerted because the call arrives with the distinctive ringing as provided through a service such as the RingMaster service.

Another alternative contemplated by the present invention is to use a service control point to instruct an end office to route calls to be accorded the telecommunication extension service to a services node. The services node then calls the wireline number and the wireless number. This alternative may be particularly useful in connection with a service control point that is not equipped with IS-41 or GSM-Map capability.

Processing By the Services Node

Referring again to the preferred embodiment, as noted above, after the SCP determines that the wireless unit is available, the SCP 24 preferably instructs the end office 16b to route the communication to the services node 30 for processing of the wireless telecommunication extension service. Although the preferred embodiment uses a services node for further processing of the wireless telecommunication extension service, it will be appreciated by those skilled in the art that other programmable network elements such as intelligent peripherals with appropriate functionality may provide such processing. For example, this further processing may be accomplished through use of only the SCP as the provider of instructions and use of the subscriber's end office to set up and monitor the conference call, if that end office is appropriately equipped. Additional alternate embodiments of the present invention are described below and in connection with FIGS. 2 and 3.

Upon receipt of the communication from the end office 16b by the services node 30, the services node 30 is programmed in a conventional manner so that wireless telecommunication extension service is accorded to the communication. In particular, when the services node 30 receives the communication from the end office 16b, the services node receives the number that was dialed by the caller. With reference to our example, the services node 30 receives Carl's and JoAnn's wireline number. The services node 30 uses this wireline number in its programming to look up in an internal or other table or database, if necessary, the wireless number that is to serve as the extension to the wireline number. Alternatively, the wireless number may be part of the information that the services node 30 receives when it receives the communication. Then the services node 30 is programmed to read the information and proceeds accordingly.

Referring again to the preferred embodiment, essentially, the services node 30 provides the communication with wireless telecommunication extension service by ringing both the wireline unit and the wireless unit and setting up a conference call with the communication, the wireline unit and the wireless unit. More particularly described, as a first step in the provision of wireless telecommunication extension service to the communication, the services node 30 preferably places a call to the subscriber's wireless number. The call to the subscriber's wireless number is referred to as the "first leg" in the conference call that is in the process of being set up by the services node 30. Referring to our example, the services node 30 places a call to 404-999-6789. Typically, the call to the wireless unit will be routed from the services node 30 to the end office 16b which further routes the call to the wireless network 14 (or elsewhere as appropriate) so as to reach the wireless unit in a manner well known to those skilled in the art.

As a second step in the provision of wireless telecommunication extension service to the communication, the services node 30 preferably places a call to the subscriber's wireline number. The call to the subscriber's wireline number is referred to as the "second leg" in the conference call that is in the process of being set up by the services node 30. It will be appreciated that the calls to the wireline number and the wireless number may be accomplished in any order, and that the designation of one of the calls as "first leg" and the other call as "second leg" is irrelevant. Nonetheless, it is preferred that the call to the wireless unit be placed first because it typically takes longer to set up a wireless call than a wireline call. By setting up the wireless call first, the goal of ringing both the wireless unit and the wireline unit at the same time is more likely to be accomplished. As with the call to the wireline number, the call from the services node 30 to the wireless number is routed through end office 16b. The careful reader will note that the call by the services node 30 to the wireline number is made through end office 16b, and thus, the call may result in another trigger and query to the SCP 24. If this trigger and query happens, the SCP 24 recognizes the call as originating with the services node 30 on the basis of the calling number that is provided in the information accompanying the query to the SCP 24. Based upon this recognition, the SCP 24 provides the end office 16b with instructions to terminate the call from the services node 30 to the wireline unit in a conventional manner.

After the services node 30 makes the calls to the wireline number and to the wireless number, the services node 30 then bridges or connects these calls so as to set up a conference call involving the communication and the calls to the wireline number and wireless number. The conference call includes a first leg from the communication at the services node 30 to the wireless unit and a second leg from the communication at the services node 30 to the wireline unit. Specifically, the services node connects each call (caller, wireline, wireless) to a port on a three-port conference bridge, which provides simultaneous, multi-way communication between all three parties.

As a result of the calls to the wireline number and to the wireless number from services node 30, the wireline unit and the wireless unit both ring, and preferably, ring concurrently. Referring to our example, if Doug dials 404-845-1234, then wireline units 20e, 20f ring and wireless unit 34 rings. In sum, wireless unit 34 functions as an extension of the wireline unit. The wireless unit functions as such an extension even though the wireless number associated with the wireless unit is different from the wireline number associated with the wireline unit.

Answering the Calls

In response to the ringing of both the wireline unit and the wireless unit, the preferred embodiment of the present invention further provides that the communication may be answered by a party at either the wireless unit or the wireline unit, or by parties at each of the units. If either the wireline unit or the wireless unit is answered in response to the ringing before the other unit is answered, then the communication is connected to the unit which has been answered. Such a unit may be referred to herein as the "answered unit". Preferably, even though one of the units has been answered, the other unit continues to ring for a predetermined number of rings, i.e., or for a preselected amount of time because a ring cycle typically lasts six seconds.

The Ringing Feature Provided During the Interval

An added feature of the preferred embodiment is a ringing feature that is provided during the initial phase of the communication. To explain this feature, assume that the call has been answered on one of the units. The ringing features provides that the caller and person who answered the call are provided with an indication that ringing is being provided on the other leg of the conference call (such indication is also known as "audible ringing"). In this way, the caller and the party who answered the call are made aware that efforts are underway to alert anybody in the vicinity of the other unit to the presence of an incoming communication. During this interval (after a party answered one of the units and while the other unit is ringing) the caller and the party who answered the call may communicate. For example, if Carl answered Doug's call, both Carl and Doug hear ringing which indicates that ringing is being provided to JoAnn's mobile telephone. Doug and Carl may communicate while the ringing is being provided to JoAnn's mobile telephone. If Doug called for JoAnn, but Carl answered the call first, Carl could suggest that Doug hang on and wait for JoAnn to pick up her mobile telephone. If JoAnn picks up the call, then all three parties could communicate, or as explained below, Carl could drop out of the communication. On the other hand, during this interval (after a party answered one of the units and while the other unit is ringing), the answering party does not have to communicate with the caller, and in fact, the answer party may hang up without affecting the call to the other unit. For example, assume Doug was calling for JoAnn, but Carl answered. After Carl answered, but before JoAnn answered, Carl may hang up without disrupting Doug's connection to JoAnn's mobile telephone. Carl's disconnection (i.e., drop-out) allows for a release of the conference bridge as explained in more detail below in connection with the dropout feature, but the caller remains connected to the call to JoAnn.

Subscriber Selectability of the Number of Rings (or Amount of Time to Ring) the Other Unit One feature of the preferred embodiment is that the subscriber may select the number of rings (or the amount of time) that the unanswered unit continues to ring before the call to that unit is discontinued. The number of rings or amount of time may differ with respect to each unit. The subscriber may change these selections by placing a call to the administrative number for the service and provide certain information in response to certain menu prompts. Advantageously, this allows a subscriber to take into the account the different uses of the respective units. For example, a party using a wireless unit is likely to be located in very close proximity to the wireless unit. Thus, the subscriber may specify that the wireless unit be provided with only a few rings. Referring to our example, JoAnn is "on the road", and her wireless unit is in her car. She does not need a lot of time or a lot of rings to answer the call to the wireless unit. On the other hand, a wireline unit may not be as readily accessible or as close to hand as an active wireless unit. Thus, the subscriber may allow for a few more rings to the wireline unit so that the party associated therewith has enough time to get to the wireline unit and answer the call. Referring to our example, Carl may be working in a part of the house 22 (such as the attic or basement) that is remote from the wireline unit 20e, 20f. He may need a little extra time to answer the call to the wireline unit.

In the preferred embodiment, if one of the units has been answered, and the other unit fails to be answered within a predetermined number of rings or within a preselected amount of time, then the call to the unanswered unit is discontinued or disconnected. After such disconnection, the services node 30 releases the conference bridge and double transfers the call that was answered back to the end office 16b. Advantageously, this disconnection and transfer back takes place without impeding the parties engaged in the communication. After release of the conference bridge, it is again available for use by other calls. Thus, this feature of the present invention provides for an increase in network efficiency and economical use of network devices. The active call (that is, the communication between the caller and the party that answered one of the units) has its respective portions connected to each other after release of the conference bridge, either directly in the services node or, by use of the end-office based ISDN transfer feature back to the end office.

In response to the ringing of both the wireline unit and the wireless unit, a party may answer the wireline unit and a different party may answer the wireless unit. In other words, the first leg set up by a call from the services node to one of the units is established and the second leg set up by a call from the services node to the other unit is also established which results in a conference call amongst the caller, and the parties who answered the units. These parties may then engage in a conference call with the caller as a result of the set up of the conference call that had been accomplished by the services node 30 when the services node 30 instituted the ringing of both units. Referring to our example, if Doug calls 404-845-1234, then Carl may answer the call to the wireline unit 20e, 20f and JoAnn may answer the call to the wireless unit 34. Doug, Carl and JoAnn may engage in a conference call. Advantageously, Doug reached both Carl and JoAnn without having to dial each of them separately. This advantage of the present invention saved Doug time and effort. This advantage also improved JoAnn's reachability because she may receive a call on the mobile telephone when the wireline number is dialed OR the mobile telephone number is dialed.

Disconnection of the Other Call

A feature of an alternate embodiment of the present invention provides for the disconnection of the unanswered unit after the other unit is answered. This disconnection may be automatic or implemented by the answering party. In this alternate embodiment, the feature provides that after one of the calls from the services node 30 (either the first leg or the second leg) is answered, the other call may be automatically or manually disconnected such that only one of the parties that answered is connected to the communication. Typically, it will be the first party that answered that remains connected to the communication. This feature may be selected for implementation by the subscriber, and enabled and disabled as other features by the subscriber through a call to an administrative number for the service.

In particular, the automatic aspect of this feature may be implemented preferably by providing that the services node 30 monitor the calls to the wireline unit and to the wireless unit such that the services node 30 notes when one of the calls is answered. After one of the calls is answered, the services node 30 then disconnects the other call. Referring to our example, Carl and JoAnn may have specified in their subscription to the wireless telecommunication extension service that once one of the units was answered, the call to the other unit be automatically disconnected. Thus, if Doug calls 404-845-1234, both the wireline unit 20e, 20f and wireless unit 34 will ring. If JoAnn is quicker in answering the call than Carl, then Carl may hear the wireline unit ring and then hear the wireline unit discontinue its ringing. If Carl nevertheless picks up the wireline unit, Carl then only hears a dial tone.

Even more particularly, the manual aspect of this feature allows one of the answering parties to provide an indication (such as dual tone multi-frequency (DTMF) signals sent via the telephone keypad, etc.) that the other call be disconnected, even if the other call has been answered. After the services node receives the indication, the services node then disconnects the other call. Referring to our example, Carl and JoAnn may have enabled the manual disconnection aspect of this feature. Thus, if Doug calls 404-845-1234, both the wireline unit 20e, 20f and wireless unit 34 ring. If either JoAnn or Carl answers the call, then either party may have the option of providing an indication to disconnect the call to the other answering party. Advantageously, this feature allows for the answer of a communication without tying up two different communication units and without tying up two different parties with a call that has already been answered by one of them. This feature is useful to a single user who might be at home, or might be on the road. This feature is also useful when the "other call" is picked up by an answering machine or voice mail system. There is little point in having a conference bridge set up amongst a caller, an answering party, and an answering machine.

Indication to Disconnect the Unanswered Call

A feature of the preferred embodiment allows the party answering the call on either the wireline unit or the wireless unit to provide an indication to the service to disconnect the call to the unanswered unit or even to disconnect the call to the other answered unit. (The disconnection of the call to the other unit where that unit has answered was discussed in the previous section). Pursuant to the feature of disconnecting the unanswered call, if a party answers the call on either unit, the answering party may provide an indication from the answered unit to the service to discontinue the ringing of the other call. This indication may be provided by pressing a particular key on the telephone keypad, by a voice recognition feature, or in any other manner well known to those skilled in the art. Preferably, the indication must be provided by the answering party within a preselected number of rings to the unanswered unit or within a preselected period of time after answer of the communication. Advantageously, the number of rings and the period of time may be selected and changed by the subscriber through an administrative call to the provider of the service. This feature allows the subscriber to selectively determine on a call-by-call basis whether to allow the other unit to continue to ring and possibly to be answered by another party. For example, Carl and JoAnn may be looking forward to Doug's call so that they may engage in a conference call with all three of them participating. On the other hand, Carl and JoAnn may wish to respond to all communications directed to their wireline unit, but also wish to minimize the expense of cellular telephone services. Thus, if Carl responds to a call on the wireline unit, he may provide an indication to the service to discontinue the ringing and thereby disconnect the call to JoAnn's mobile phone. JoAnn will have noticed the ringing of her mobile phone, but the discontinuance of the ringing within a certain number of rings will assure her that Carl took the call on the wireline unit.

If a party that answers the call provides an indication to disconnect the other unanswered call, then the indication is preferably detected by the services node 30. In the preferred embodiment, if the services node detects such an indication, then the services node connects a tone monitor to the call to detect the tone. In response to detecting the indication from the answered unit, the services node 30 disconnects the call to the unanswered unit. After such disconnection, the services node 30 releases the conference bridge and double transfers the call that was answered back to the end office 16*b*. Referring to our example, if JoAnn is the first to pick up one of the calls from the services node, JoAnn may save Carl the trouble of answering the other unit by providing an indication that the call to Carl's unit be disconnected. Advantageously, this feature allows for an answer to a communication without tying up two different communication units and without tying up two different parties with a call that has already been answered by one of them. Of course, the party that answers one of the calls first does not have to provide any kind of disconnection indication. In that case, as described above, the other call may be answered by another party and a conference call including the caller, and the parties associated with the wireline unit and wireless unit may take place. Or, the other call will go unanswered, and that unanswered call then is disconnected.

Monitoring For Drop-Out of a Unit

One advantage of the services node 30 in setting up and holding of the conference call is that the services node 30 preferably may monitor the conference call for the drop-out of either or both of the units. In response to detecting the drop-out of one of the units, the services node 30 preferably then disconnects the communication from the unit that dropped-out. After such disconnection, the services node 30 releases the conference bridge and double transfers the call that was answered back to the end office 16*b*. In this manner, the communication remains connected to the unit that did not drop-out. Advantageously, the disconnection and transfer back is accomplished transparently to the parties engaged in the communication. Referring to our example, if Doug has been involved in a conference call with Carl on the wireline unit and JoAnn on the wireless unit, Carl may tire of the conversation or otherwise decide to hang up. Once Carl hangs up, the services node 30 detects that Carl's unit has dropped-out, and the services node 30 takes itself out of the picture by disconnecting the communication to Carl's unit and transfers the communication back to the end office 16*b*.

Processing of the Wireless Telecommunication Extension Service By a Programmable Network Element Those skilled in the art will understand that the functions performed by the services node in the preferred embodiment may be alternatively performed by a different device such as a programmable network element.

Using the Other Unit for Telecommunications

Yet another feature of the preferred embodiment is that the wireless telecommunication extension service allows for either of the units to be used for telecommunication purposes even though the other unit may be engaged in a communication. For example, assume that Doug called 404-845-1234, and the wireless telecommunication extension service was accorded to his communication. Further assume that Doug was engaged in a conversation only with JoAnn, who is using the wireless unit. For purposes of this example, Carl may never have answered the wireline unit, or JoAnn or the service may have disconnected or cancelled the call to Carl's unit, or Carl may have dropped-out of the communication with Doug and JoAnn. Then Carl may receive another communication on the wireline unit from somebody other than Doug. Alternatively, Carl may use the wireline unit to place a call to somebody else. The on-going communication between the caller and the wireless unit functioning as an extension to the wireline unit does not affect the use of the wireline unit, if the wireline unit is not connected to the caller. Similarly, the same lack of effect pertains to the wireless unit, so long as the wireless unit is not connected to an on-going communication between the caller and the wireline unit.

Advantageously, this feature provides the subscriber with a wireless extension to a wireline unit, but it does not deprive the subscriber of the use of two separate telecommunication units. In fact, the wireless telecommunication extension service provides a greater advantage to the subscriber than simply having an extra telephone serve as an extension. With the present invention, the subscriber retains the use of two telecommunication units with their respective different directory numbers so that separate calls may be received and placed as desired.

Generalization of the Present Invention

Certain generalizations may be made based on the foregoing description of the preferred embodiment. The foregoing explanation of the present invention has been provided in the context of a telecommunication service that allows a wireless unit to serve as an extension to a wireline unit. But it will be appreciated that the present invention may be used to provide alternate extension services. The present invention may be used to provide a service that (1) allows a wireless unit to serve as an extension to another wireless unit; or that (2) allows a wireline unit with a particular directory number to serve as an extension to another wireline unit with a different directory number. In addition, the foregoing explanation of the present invention has been provided in the context of a service that allows a single wireless unit (having its own directory number) to serve as an extension to a wireline unit (having its own directory number). But it will also be apparent that the present invention may be used to provide a service that allows one or more units (wireless or wireline, or a combination thereof) with each such unit having its own directory number to serve as an extension to another unit (wireless or wireline). The changes to the preferred embodiment that would be necessary to accommodate these alternate extension services will be readily understood by those skilled in the art given the detailed description above. Advantageously, these alternate extension services provide a subscriber great flexibility and choice with respect to the delivery of telecommunications service, and increase subscriber satisfaction. Increased subscriber satisfaction is a principal goal of a service provider in the increasingly competitive field of telecommunications.

Alternate Embodiments

It will be appreciated that the wireless telecommunication extension service of the present invention may be provided through the use of network elements different from or configured differently from the elements described in connection from the preferred embodiment. Further, the wireless telecommunication extension service may be provided through different operation of the network elements as described in connection with the preferred embodiment. FIGS. 2 and 3 illustrate two different alternatives to the preferred embodiment described in connection with FIG. 1. These alternatives differ chiefly from the preferred embodiment in that the provision of the wireless telecommunication extension service is provided through elements associated with the wireless network rather than with the wireline network. These differences will be generally transparent to the users of the wireless telecommunication extension service.

In addition, the alternate embodiments of FIGS. 2 and 3 assume the existence of a wireless local loop service that also provides for wide area mobile telecommunication services. The term "wireless local loop services" is used herein to describe the provision of telecommunication services to terminating devices (telephones, facsimile machines, etc.) by a wireless network. Referring to FIGS. 2 and 3, the careful reader will note that the exemplary telephones 20e, 20f that were fixed wireline devices in FIG. 1 (through a wireline connection to the PSTN 12) are wireless devices in FIGS. 2 and 3. Telephones 20e, 20f are connected to a fixed wireless network home base station 42 that receives and transmits communications to and from telephones 20e, 20f through the wireless network 14 by way of antenna 39 and wireless network switch 36. The careful reader may question whether the present invention has to check the availability of telephones 20e, 20f in the wireless local loop just as the availability of the wireless unit 34 has to be checked. Typically, it will be unnecessary to perform such a check of the availability of telephones 20e, 20f in the wireless local loop because these telephones 20e, 20f are likely to be stationery or fixed within the home or business 22. Thus, these telephones 20e, 20f are typically always active, although they may be engaged, i.e. busy.

Alternative Environment—FIG. 2

Given the general differences explained above between the preferred embodiment and the alternate embodiments, the alternate embodiment of FIG. 2 is generally the same as the preferred embodiment of FIG. 1 in that a service control point and a services node are used to perform certain functions. The principal difference is that the service control point 24 and services node 30 constitute elements of the wireless network 14 rather than the PSTN 12. In particular, SCP 24 is connected to wireless network switch 36 by a datalink as will be well known to those skilled in the art and services node 30 is connected to wireless network switch 36. The service control point 24 and services node 30 in the wireless network differ from their counterparts in the wireline network as will be apparent to those skilled in the art in that SCP 24 and services node 30 must interface and communicate pursuant to formats that are used in a wireless network. It will be further appreciated that the differences of this embodiment do not change the function or features provided by the wireless telecommunication extension service. The differences just change the manner in which the service is provided as will be apparent to those skilled in the art from the description below.

Referring to FIG. 2, this alternate embodiment is explained through the use of the example of Doug calling his friends, Carl and JoAnn, using their directory number, 404-999-1234. The call is received by the PSTN 12 and routed in a manner well known to those skilled in the art to the wireless network 14. The call is further routed (if necessary) until it reaches the wireless network switch 36 that serves Carl's and JoAnn's telephones 20e, 20f. The processing of the call then proceeds in the same manner as described above in connection with the preferred embodiment except that in the alternate embodiment of FIG. 2, the wireless network switch 36 performs the functions of end office 16, and SCP 24 and services node 30 are directly connected to wireless network switch 36.

The common use of a service control point in connection with the embodiments of FIGS. 1 and 2 provides an opportunity here to point out the advantages gained by the use of a service control point in connection with the present invention. For example, the use of a service control point in connection with the wireless telecommunication extension service saves network resources in certain situations. With respect to both of the embodiments of FIGS. 1 and 2, SCP 24 suspends processing of the communication and of the wireless telecommunication extension service early in the history of the call so as to determine whether a wireless unit is available to respond to the call. If the wireless unit is unavailable, then the SCP 24 provides instructions that the communication be handled in a conventional manner. In this way, the service control point prevents network resources from being wasted in the effort to send a call to a wireless unit that is unavailable. In fact, if the service control point receives information that the wireless unit is unavailable, the service control point will not involve the services node in the processing of the call. This saves the resources of the services node as well as other telephony plant for other uses.

Alternative Environment—FIG. 3

The alternate embodiment illustrated in FIG. 3 does not include a service control point in providing the wireless telecommunication extension service of the present invention. As with the alternate embodiment described in connection with FIG. 2, the alternate embodiment of FIG. 3 includes a services node as a wireless network element that is connected to wireless network switch 36. The services node 30 in the wireless network differs from its counterpart in the wireline network as will be apparent to those skilled in the art in that the services node 30 must interface and communicate pursuant to formats that are used in a wireless network. It will be further appreciated that the differences of this embodiment do not change the function or features provided by the wireless telecommunication extension service. The differences just change the manner in which the service is provided as will be apparent to those skilled in the art from the description below.

Referring to FIG. 3, the call from Doug directed to his friends, Carl and JoAnn, is received by the PSTN 12 and routed in a manner well known to those skilled in the art to the wireless network 14. The call is further routed (if necessary) until it reaches the wireless network switch 36 that serves Carl's and JoAnn's telephones 20e, 20f. In response to receipt of the call, the wireless network switch 36 is programmed to respond to the information associated with the call to check with the home location register (HLR) 40 for instructions with respect to the processing of the call. In response to the query from the wireless network switch 36, the home location register (HLR) 40 is programmed to provide the switch 36 with communication routing instructions, and in particular, to provide the switch 36 with communication routing instructions to route the communication to the services node 30. Upon receipt of the communication, the services node 30 checks with the HLR 40 for availability information to determine whether the wireless unit is available for the communication. To provide such availability information, the HLR 40 may carry out certain functions that will be apparent to those skilled in the art as to whether the wireless unit is available. (For further details, see discussion in connection with FIG. 1 regarding availability information) If the wireless unit is unavailable, then the services node provides the wireless network switch 36 with instructions to terminate the call in a conventional manner. In other words, only a call to the wireline unit is placed. If the wireless unit is available, then the services node places a call to both the wireline unit and the wireless unit. The processing of the call then proceeds in the same manner as described above in connection with the preferred embodiment except that in the alternate embodiment of FIG. 3, the services node 30 is directly connected to wireless network switch 36.

Flow Diagram of the Operation of the Preferred Embodiment

For a straight forward explanation of the operation of the preferred embodiment as described above in connection with FIG. 1, a flow diagram of the telecommunication extension service is provided in FIGS. 4A and 4B. The flow diagram picks up after a communication directed to a subscriber's wireline unit is received, and a positive determination has been made that the telecommunication extension service is to be accorded to the communication. As illustrated in FIG. 4A, the flow diagram is entered at start step 100, and proceeds to optional step 102 wherein a check is made to determine whether the telecommunication extension service has been enabled. If not, then in step 104 conventional (or other) telecommunications service is provided to the communication in routing it to the wireline unit, and the process ends in step 106. Referring again to step 102, if the check in step 102 is positive, then in step 108 a check is made to determine whether the appropriate wireless unit is available for the communication. If not, then the process proceeds to step 104 and provides conventional (or other) telecommunications service, and the process ends in step 106.

Referring again to step 108, if the check in step 108 is positive, then in step 110 ringing is provided to the wireline and wireless units. In step 112, a check is made as to whether either of the units have been answered. If there has been an answer, then the process proceeds to step 122 (see FIG. 4B). If no answer has been detected, then the process checks whether secondary call treatment is to be accorded. Such secondary call treatment may include voicemail, call forward no answer, or other treatment depending on the subscription of the subscriber. If secondary call treatment is to be accorded, then in step 117 the communication is routed to secondary call treatment as appropriate, and the process ends instep 18. If secondary call treatment is not to be accorded, then in step 119 a check may be made to determine whether a busy (or similar) status or signal has been encountered. If so, then the process proceeds to steps 117 et seq. wherein a busy signal to the caller (or as otherwise necessary) is provided as part of the secondary call treatment. If no busy (or similar) status or signal has been encountered, then in step 120 an optional check may be made as to whether a time-out or some other event like the expiration of a certain number of rings has occurred. If the time-out or other event has occurred, then the process proceeds to step 117 et seq. wherein an announcement or some other service may be provided as part of the secondary call treatment. On the other hand, if the time-out or other event has not occurred, then the process returns to step 110 and continues to ring both of the units and to proceed with the steps as described above.

The flow diagram continues on FIG. 4B with step 122 which follows a positive determination in step 116 (FIG. 4A) that one of the units has answered. In step 122, a check is made as to whether it was the wireline unit or the wireless unit that answered. If the wireless unit answered, then the flow diagram illustrates the process followed in the preferred embodiment in steps 124–138 and 156–164. On the other hand, if the wireline unit answered, then the flow diagram illustrates the process followed in the preferred embodiment in steps 140–160 and 166–168.

Referring to step 124, if the wireless unit answered, then a call is connected or terminated to the wireless unit. In step 126, a check is made as to whether ringing should be continued to the wireline unit. Reasons for the continuation or discontinuation of ringing are discussed in detail above in connection with the preferred embodiment described with reference to FIG. 1. If ringing is to be discontinued, then the process ends in step 128. On the other hand, if ringing is to be continued, then in step 130 ringing is provided. In optional step 132, a check is made to determine whether the wireline unit is busy, i.e., engaged. If so, then secondary call treatment may be provided as necessary (such as a busy signal to the caller), and the process ends in step 134. If the wireline unit is not busy, then in step 136 a check is made to determine whether the wireline unit has answered. If not, then the process returns to steps 126 et seq. to determine whether ringing is to be continued to the wireline unit. Referring again to step 136, if the wireline unit has answered, then in step 138 a connection is made to the wireline unit 138. At this point, connections have been established from the communication to both the wireless unit and the wireline unit.

Referring again to the check in step 122, if the check determines that the wireline unit has answered, then in step 140 the communication is connected or terminated to the wireline unit. In step 142, a check is made as to whether ringing should be continued to be provided to the wireless unit. Reasons for the continuation or discontinuation of ringing are discussed in detail above in connection with the preferred embodiment described with reference to FIG. 1. If ringing is to be discontinued, then the process ends in step 144. On the other hand, if ringing is to be continued, then in step 146 ringing is provided. In optional step 148, a check is made to determine whether the wireless unit is busy, i.e., engaged. If so, then secondary call treatment may be provided as necessary (such as a busy signal to the caller), and the process ends in step 150. If the wireless unit is not busy, then in step 152 a check is made to determine whether the wireless unit has answered. If not, then the process returns to steps 142 et seq. to determine whether ringing is to be continued to the wireless unit. Referring again to step 152, if the wireless unit has answered, then in step 154 a connection is made to the wireless unit 154. At this point, connections have been established from the communication to both the wireless unit and the wireline unit.

After steps 138 and 154, and the establishment of a connection from the communication to both the wireless unit and the wireline unit, in step 156 the process monitors the communication for the drop-out of one or both of the units. In step 158, a check is made as to whether a drop-out has occurred. If not, then the process returns to step 156 with respect to the monitoring of the communication with respect to drop-out. On the other hand, if the check in step 158 was positive, then in step 160 a check is made to determine whether it was the wireline unit or the wireless unit that dropped-out. If it was the wireless unit, then in step 162 the communication is disconnected from the wireless unit and the process proceeds to end in step 164. Referring to step 160 again, if the wireline unit dropped-out, then in step 166 the communication is disconnected from the wireline unit and the process proceeds to end in step 168.

In sum, the preferred embodiment provides a wireless telecommunication extension service to a subscriber such that a subscriber may specify that the subscriber is alerted to a call directed to a particular directory number by the ringing of a wireline unit associated with the particular directory number and by the ringing of a preselected wireless unit associated with the subscriber. Pursuant to this service, the wireless unit acts as an extension to the subscriber's wireline unit. Advantageously, the use of a wireless unit as an extension allows the subscriber to receive calls directed to the subscriber's wireline unit even when the subscriber is not present in the location of the wireline unit. The use of a wireless unit as an extension to a wireline unit allows the subscriber freedom to move away from the location of the wireline unit without missing calls. Other advantages of the present invention have been described above, and yet other advantages of the present invention will be apparent to those skilled in the art.

Flow Diagram of the Operation of Another Preferred Embodiment

FIG. 5 is a flow diagram indicating a preferred operation of the present invention. FIG. 5 is presented as an illustration of another concise representation of some of the steps of the present invention. The flow diagram of FIG. 5 also picks up after a communication directed to a subscriber's wireline unit is received, and a positive determination has been made that the telecommunication extension service is to be accorded to the communication. As illustrated in FIG. 5, the flow diagram is entered at start step 200, and proceeds to optional step 202 wherein a check is made to determine whether the telecommunication extension service has been enabled. If not, then in step 204 conventional (or other) telecommunications service is provided to the communication in routing it to the wireline unit, and the process ends in step 206. Referring again to step 202, if the check in step 202 is positive, then in step 208 a check is made to determine whether the appropriate wireless unit is available for the communication. If not, then the process proceeds to step 204 and provides conventional (or other) telecommunications service, and the process ends in step 206.

Referring again to step 208, if the check in step 208 is positive, then in step 210 a call is made respectively to the wireline and wireless units. As a result of step 210, three alternatives are possible. In step 212, both calls time-out; in step 214, both calls are busy; or in step 216, the first party answers. Referring to step 212, when both calls timeout, the process lets the caller continue to hear ringing at step 218, and then the process ends at step 220. Referring to step 214, when both calls are busy, the process plays a busy signal to the caller at step 222, then the process ends at step 220.

Referring to step 216, when the first party answers, the process connects the first party to the caller at step 224. At this point, three alternatives are possible. In step 226, the call to the second party times out; in step 228, the first party requests a disconnection of the call to the other unit; or in step 230, the second party answers. Referring to step 226, when the call to the second party times out, that call is dropped at step 232 and the first party and caller are connected at step 234. The process then ends at step 236. Referring to step 228, when the first party requests a disconnection of the call to the other unit, the call to the second party is dropped at step 232 and the first party and caller are connected at step 234. The process then ends at step 236. Referring to step 230, when the second party answers, the first and second parties are bridged at step 238. At this point, two alternatives are possible. At step 240, either party disconnects or at step 242, either party requests disconnection of the call to the other unit. Referring to step 240, when either party disconnects, the remaining party and the caller are connected at step 244 and the process then ends at step 236. At step 242, when either party requests disconnection, the remaining caller and the caller are connected at step 244 and the process ends at step 236.

While this invention has been described in detail with particular reference to the preferred embodiment thereof, it will be understood that variations, modifications and alternate embodiments can be effected within the spirit and scope of the invention as described hereinabove and as defined in the appended claims.

We hereby claim:

1. In a telecommunications network, a system for providing a telecommunications extension service to a subscriber who has a first unit for telecommunications and a second unit for telecommunications, said first unit having a first number used for communication routing, and said second unit having a second number used for communication routing, comprising:

a switch operative
to receive a communication directed to said first number associated with said first unit,
to suspend the processing of said communication, and
to request communication processing instructions from a first programmable network element;
said first programmable network element being connected to said switch, and in response to receipt of said request for said communication processing instructions, said first programmable network element being operative
to check whether said second unit is available,
if said second unit is available, to provide said communication processing instructions to said switch, said processing instructions including a direction to route said communication to a second programmable network element;
said switch being further operative to receive and respond to said communication processing instructions by routing said communication to said second programmable network element; and
said second programmable network element being operative to respond to the receipt of said communication by setting up a first leg of a conference call from said communication to said first unit, and
setting up a second leg of said conference call from said communication to said second unit, and
causing ringing to be provided to said first unit and said second unit.

2. The system of claim 1, wherein said second unit is a wireless unit;
wherein said first programmable network element is directly connected to a home location register via a data link;
wherein said first programmable network element is further operative to check whether said wireless unit is available by
formatting a request for availability information relating to said wireless unit in a wireless network protocol, and
sending said request for said availability information over said data link that directly connects said first programmable network element and said home location register;
wherein said home location register is operative to respond to said request for said availability information by sending said availability information over said data link to said first programmable network element; and
wherein said first programmable network element is further operative to receive said availability information, and based thereon, to provide said switch with said communication processing instructions.

3. The system of claim 1, wherein said second programmable network element is further operative to detect whether either said first unit or said second unit is answered in response to said ringing before the other unit of said first unit or said second unit is answered, to connect said communication to the answered unit of said first unit or said second unit, and to continue to have ringing provided to said other unit for a predetermined number of rings or for a preselected amount of time so that said other unit may be answered within said predetermined number of rings or said preselected amount of time.

4. The system of claim 3, wherein said second programmable network element is further operative to connect said communication to said other unit, if said other unit is answered, whereby said communication is connected to said first unit and said second unit.

5. The system of claim 4, wherein said second programmable network element is further operative to monitor said communication connected to said answered unit and said other unit for the drop-out of one unit of said answered unit or said other unit; and in response to detecting said drop-out of said one unit, to disconnect said communication from said one unit, whereby said communication remains connected to the unit other than said one unit.

6. The system of claim 1, wherein said second programmable network element is further operative, if either said first unit or said second unit is answered in response to said ringing before the other unit of said first unit or said second unit, then to connect said communication to the answered unit of said first unit and said second unit, and to provide that said ringing be discontinued to said other unit, whereby said communication is connected only to said answered unit, and said other unit may not be answered after said connection of said communication to said answered unit.

7. The system of claim 6, wherein said second programmable network element is further operative to respond to receipt of an indication from said answered unit to discontinue said ringing by providing that said ringing be discontinued to said other unit.

8. In a telecommunications network, a method for checking the availability of a wireless unit to receive a communication, comprising the steps of:

a. receiving a communication at a service switching point;

b. causing said service switching point
   to suspend the processing of said communication, and
   to launch a query to a service control point for communication processing instructions;

c. in response to said query, causing said service control point to check whether said communication is directed to a wireless number associated with said wireless unit;

d. if said communication is directed to said wireless number associated with said wireless unit, then causing said service control point
   to format a request for availability information relating to said wireless unit in a wireless network protocol, and
   to send said request for said availability information over a data link that directly connects said service control point and a home location register;

e. in response to said request for said availability information, causing said home location register to send said availability information over said data link to said service control point; and f. in response to receipt of said availability information, causing said service control point to provide said service switching point with said communication processing instructions.

9. The method of claim 8, further comprising the step of:

g. prior to causing said service control point to provide said service switching point with said communication processing instructions, and in response to receipt of said availability information, causing said service control point
   to examine the content of said availability information, and
   to base the content of said communication processing instructions on said content of availability information.

10. The method of claim 8, g. prior to causing said service control point to provide said service switching point with said communication processing instructions, and in response to receipt of said availability information, causing said service control point
   to examine the content of said availability information, and
   if said content indicates that said wireless unit is available, then to instruct said service switching point in said communication processing instructions to route said communication to said wireless unit.

11. The method of claim 8, g. prior to causing said service control point to provide said service switching point with said communication processing instructions, and in response to receipt of said availability information, causing said service control point to examine the content of said availability information, and if said content indicates that said wireless unit is unavailable, then to instruct said service switching point in said communication processing instructions to provide the caller with notice that said wireless unit is unavailable.

12. In a telecommunications network, a system for providing a telecommunications extension service to a subscriber who has a first unit having a first directory number for routing telecommunications to the first unit and a second unit having a second directory number for routing telecommunications to the second unit, comprising:

a switch operative
   to receive a communication directed to said first directory number, and
   in response, to route said communication to a programmable network element in said telecommunications network;

said programmable network element being operative to respond to the receipt of said communication by
   setting up a first leg of a conference call from said communication to said first unit by using said first directory number to set up said first leg,
   setting up a second leg of said conference call from said communication to said second unit by using said second directory number to set up said second leg,
   causing first ringing to be provided to said first unit, and
   causing second ringing to be provided to said second unit; and wherein said programmable network element is directly connected to a home location register via a data link and is further operative to check whether said wireless unit is available by
  formatting a request for availability information relating to said wireless unit in a wireless network protocol, and
  sending said request for said availability information over said data link that directly connects said programmable network element and said home location register;
wherein said home location register is operative to respond to said request for said availability information by sending said availability information over said data link to said programmable network element; and
wherein said programmable network element is further operative to receive said availability information, and based thereon, to provide said switch with said communication processing instructions.

13. The system of claim 12, wherein said first unit has a non-service number;
wherein said switch is operative to receive a non-service communication directed to said non-service number; and
wherein said switch is further operative to route said non-service communication to said first unit and to cause non-service ringing to be provided to said first unit, said non-service ringing being distinctive from said first ringing.

14. In a telecommunications network, a system for providing a telecommunications extension service to a subscriber who has a first unit having a first directory number for routing telecommunications to the first unit and a second unit having a second directory number for routing telecommunications to the second unit, comprising:
  a switch operative
    to receive a communication directed to said first directory number associated with said first unit, and
    to request communication processing instructions from a programmable network element in said telecommunication network; and
  said programmable network element being responsive to the receipt of said request for said communication processing instructions,
    to set up a first leg of a conference call from said communication to said first unit,
    to set up a second leg of said conference call from said communication to said second unit, and
    to cause ringing to be provided to said first unit and said second unit; and
  wherein said programmable network element is directly connected to a home location register via a data link and is further operative to check whether said wireless unit is available by
    formatting a request for availability information relating to said wireless unit in a wireless network protocols and
    sending said request for said availability information over said data link that directly connects said programmable network element and said home location register;
  wherein said home location register is operative to respond to said request for said availability information by sending said availability information over said data link to said programmable network element; and
  wherein said programmable network element is further operative to receive said availability information, and based thereon to provide said switch with said communication processing instructions.

15. The system of claim 14, wherein said programmable network element is further operative to be responsive to said receipt of said request by, before setting up said second leg, checking whether said second unit is available, and only if said second unit is available, setting up said second leg.

16. The system of claim 14, wherein said programmable network element is further operative
  to detect whether either said first unit or said second unit is answered in response to said ringing before the other unit of said first unit or said second unit is answered,
  to connect said communication to the answered unit of said first unit or said second unit, and
  to continue to have ringing provided to said other unit for a predetermined number of rings or for a preselected amount of time so that said other unit may be answered within said predetermined number of rings or said preselected amount of time.

17. The system of claim 16, wherein said programmable network element is further operative to connect said communication to said other unit, if said other unit is answered, whereby said communication is connected to said first unit and said second unit.

18. The system of claim 17, wherein said programmable network element is further operative
  to monitor said communication connected to said answered unit and said other unit for the drop-out of one unit of said answered unit and said other unit; and
  in response to detecting said drop-out of said one unit, to disconnect said communication from said one unit, whereby said communication remains connected to the unit other than said one unit.

19. The system of claim 14, wherein said first unit is a wireline unit;
  wherein said second unit is a wireless unit; and
  wherein said programmable network element is further operative, if either said wireline unit or said wireless unit is answered in response to said ringing before the other unit of said wireline unit or said wireless unit, then
    to connect said communication to the answered unit of said wireline unit or said wireless unit, and
    to provide that said ringing be discontinued to said other unit, whereby said communication is connected only to said answered unit, and said other unit may not be answered after said connection of said communication to said answered unit.

20. The system of claim 19, wherein said programmable network element is further operative to respond to a receipt of an indication from said answered unit to discontinue said ringing by providing that said ringing be discontinued to said other unit.

* * * * *